United States Patent
Adylov et al.

(10) Patent No.: US 10,630,560 B2
(45) Date of Patent: Apr. 21, 2020

(54) METHOD AND USER INTERFACES FOR MONITORING, INTERPRETING AND VISUALIZING COMMUNICATIONS BETWEEN USERS

(71) Applicant: BEHAVOX LTD., London (GB)

(72) Inventors: Erkinbek Adylov, London (GB); Aleksandr Glasman, Saint Petersburg (RU); Roman Zelov, Saint Petersburg (RU)

(73) Assignee: Behavox Ltd., London (GB)

( * ) Notice: Subject to any disclaimer, the term of this patent is extended or adjusted under 35 U.S.C. 154(b) by 332 days.

(21) Appl. No.: 15/088,717

(22) Filed: Apr. 1, 2016

(65) Prior Publication Data

US 2017/0026254 A1 Jan. 26, 2017

Related U.S. Application Data

(60) Provisional application No. 62/142,360, filed on Apr. 2, 2015.

(51) Int. Cl.
| | |
|---|---|
| *G06F 15/16* | (2006.01) |
| *H04L 12/26* | (2006.01) |
| *H04L 29/08* | (2006.01) |
| *H04L 12/58* | (2006.01) |
| *H04M 3/22* | (2006.01) |
| *G06F 17/28* | (2006.01) |
| *G06K 9/00* | (2006.01) |
| *G06T 11/20* | (2006.01) |
| *G06F 3/0481* | (2013.01) |

(52) U.S. Cl.
CPC ............ *H04L 43/04* (2013.01); *G06F 17/28* (2013.01); *G06K 9/00442* (2013.01); *G06T 11/206* (2013.01); *H04L 51/16* (2013.01); *H04L 51/34* (2013.01); *H04L 67/22* (2013.01); *H04M 3/2218* (2013.01); *G06F 3/04817* (2013.01); *G06K 2209/01* (2013.01); *G06T 2200/24* (2013.01); *H04M 2203/555* (2013.01)

(58) Field of Classification Search
CPC ......... H04L 43/04; H04L 51/16; H04L 51/34; H04L 67/22; G06F 17/28; G06F 3/04817; G06K 9/00442; G06K 2209/01; G06T 11/206; G06T 2200/24; H04M 2203/555; H04M 3/2218
USPC .................................................. 709/204, 224
See application file for complete search history.

(56) References Cited

U.S. PATENT DOCUMENTS 6,832,245 B1 * 12/2004 Isaacs .................. G06F 16/284
709/206
8,572,094 B2 * 10/2013 Luo ........................ G06Q 10/10
707/748

(Continued)

*Primary Examiner* — Oscar A Louie
*Assistant Examiner* — Oluwatosin M Gidado
(74) *Attorney, Agent, or Firm* — Maschoff Brennan

(57) ABSTRACT

A computer implemented method for monitoring a plurality of communications between a first correspondent and a second correspondent, the method comprising: receiving metadata for each of the plurality of communications; determining one or more measures of association between the first and second correspondent, wherein said determining comprises identifying one or more indicators of association in said metadata; and storing in memory the one or more measures of association between the first and second correspondence.

17 Claims, 16 Drawing Sheets

(56) References Cited

U.S. PATENT DOCUMENTS

| | | | | |
|---|---|---|---|---|
| 8,682,723 | B2* | 3/2014 | Parsons | G06Q 10/00 |
| | | | | 705/14.52 |
| 8,880,555 | B2* | 11/2014 | Tseng | G06Q 30/02 |
| | | | | 707/791 |
| 9,454,519 | B1* | 9/2016 | Keysers | G06F 17/241 |
| 9,509,846 | B1* | 11/2016 | Jandwani | H04M 3/5232 |
| 9,870,424 | B2* | 1/2018 | Neystadt | G06Q 50/01 |
| 2007/0094158 | A1* | 4/2007 | Osoda | G06N 3/08 |
| | | | | 706/12 |
| 2008/0052371 | A1* | 2/2008 | Partovi | G06Q 10/10 |
| | | | | 709/217 |
| 2014/0095150 | A1* | 4/2014 | Berjikly | G06F 17/2785 |
| | | | | 704/9 |
| 2014/0278786 | A1* | 9/2014 | Liu-Qiu-Yan | G06Q 30/0201 |
| | | | | 705/7.32 |
| 2015/0120717 | A1* | 4/2015 | Kim | G06F 16/335 |
| | | | | 707/727 |
| 2015/0120757 | A1* | 4/2015 | Gillespie | G06F 17/3053 |
| | | | | 707/748 |
| 2016/0224655 | A1* | 8/2016 | Oliver | G06F 17/30675 |
| 2017/0099339 | A1* | 4/2017 | Bastide | G06F 16/23 |
| 2018/0373683 | A1* | 12/2018 | Hullette | G06Q 50/01 |

* cited by examiner

METHOD AND USER INTERFACES FOR MONITORING, INTERPRETING AND VISUALIZING COMMUNICATIONS BETWEEN USERS

FIELD OF THE INVENTION

This invention relates to methods and user interface mechanism for monitoring communications between users, on the basis of correspondence between them stored on a digital computer.

BACKGROUND

As users move more towards digital and digitally recordable means of communications, it is becoming easier to monitor the communications of large groups of people, such as employees. This can be particularly beneficial to companies that wish to evaluate the performance and behaviours of their employees through automated means.

However, while systems are available to automatically log and record phone calls, emails and chat messages within office environments, existing methods of processing these large volumes of data are computationally expensive and typically require a high degree of human intervention. Many companies are now in a position where they are overloaded with communication-related data, but have neither the computational hardware nor the time to process the data in a meaningful way.

Determining whether a user is communicating with a client or a friend, for example, either requires prior user-input identifying which correspondents are work-related, or requires computationally expensive natural language processing (NLP) systems to understand and process the content of communications.

There is therefore a need for a computationally efficient means of monitoring communications between correspondents and automatically evaluating the nature of the communications and the relationships between the correspondents. There is also a need for a user interface to enable a user to interact with and visualise the large amounts of data available in a meaningful format.

SUMMARY OF INVENTION

In a first aspect of the present invention, the applicant makes available a computer-implemented method for monitoring a plurality of communications between a first correspondent and a second correspondent, the method comprising: receiving metadata for each of the plurality of communications; determining one or more measures of association between the first and second correspondent, wherein said determining comprises identifying one or more indicators of association in said metadata; and storing in memory the one or more measures of association between the first and second correspondence.

Establishing the level of association between correspondents typically requires human intervention (i.e. manually entering data about the association between the correspondents), or requires highly complex natural language processing to read and understand the content of communications. This is because levels of association between correspondents, such as the closeness or the importance of a relationship, can be difficult to quantify without a complex understanding of how people associate with each other.

Instead, the proposed solution relies on metadata associated with the communications, and identifies indicators of association within the metadata. Therefore, rather than processing the whole content of a communication, the proposed solution can quickly determine in O(1) time whether a communication has metadata matching the requirements to indicate association. The applicant has identified that indicators of association can be found within metadata, and therefore proposes using these indicators to determine degree quantifiable measure of association between correspondents. As a result, the proposed solution can quickly and automatically determine measures of association between correspondents based only on the communications between the correspondents. This allows for a computationally efficient and streamlined monitoring system.

In some example embodiments the plurality of communications are received over a predetermined period of time. By setting a predetermined period of time to monitor communications, it is possible to monitor changes in degrees of association over time. By incorporating this time aspect when determining the degrees of association makes it easier to make time-dependent evaluations and comparisons.

In some example embodiments the plurality of communications include any one or more of: a phone call, an email, and an electronic message. The proposed solution is not limited to phone calls, email or electronic messages, as it the solution is envisioned to work with any means of that can be digitised. An analogue phone call can be digitally recorded with associated metadata, or it may already be a digital call in the form of VoIP, for example. Similarly, physical mail can have their metadata data entered into a computer system automatically upon sending or receiving the letter, and content of the letters themselves may be digitally recorded by optical content recognition (OCR).

In some example embodiments the indicators of association include a frequency of communications between the first and second correspondent. The frequency of communication between two correspondents can be indicative of the degree of association between them. For example, a high frequency of communication may indicate a close relationship, and increasing frequencies of communication may indicate an increase in importance of the relationship as the two correspondents work together more closely on more important tasks.

In some example embodiments the indicators of association include a ratio of inbound and outbound communications within the plurality of communications. The ratio of inbound and outbound communications can be used as an indicator of the level of association between correspondents. For example, an impersonal salesman-client relationship may involve much more communications being sent by the salesman, with an unresponsive client. However, a more even exchange of communications may indicate a closer or more important relationship between the two correspondents.

Where the communication is in the form of a phone call, the ratio can be established by looking into which correspondent initiates the call. Similarly for emails and chat logs, the ratio can be determined by looking into either the ratio of threads initiated by a correspondent or the ratio of individual messages sent by a correspondent.

In some example embodiments the indicators of association include a quantity of related communications within the plurality of communications. In certain forms of communication, different communications can be related to one another. For example, in emails and chat logs, different messages can be part of a single thread. The length of such a thread may be indicative of the importance of the communications and the closeness of the correspondents.

In some example embodiments the indicators of association include a size of a communication. The size of a communication may correspond to the duration of a phone call, or the length of an email message, for example.

In some example embodiments the indicators of association include a time of a communication. The applicant has identified that the timing of a communication may provide several indicators of the measure of association between correspondents. For example, calls made outside of office hours may indicate a close relationship, and messages sent during particularly busy periods may indicate that those messages are of higher priority and importance.

In some example embodiments the indicators of association include a ratio of inbound and outbound correspondence within a communication. In certain forms of communication, such as a phone calls and chat logs, there may be a constant exchange of communications within a single communication. For example, within a single phone call one correspondent may speak for a longer duration than the other correspondent, indicating discrepancies in the commitment to the call. Therefore, monitoring the exchange of correspondence within a communication may be used for determining a measure of association. There may be metadata collected with a phone log indicating times when audio is being transmitted or received, or simple voice recognition techniques may be used to identify which of the two correspondents are talking at any one time.

In some example embodiments the indicators of association include a latency between related communications within the plurality of communications. The applicant has identified that the latency (time difference) between a communication from one correspondent and a response from the other correspondent can be used as an efficient indicator of association between correspondents. For example, a low latency in communications may indicate a close relationship and high level of familiarity between correspondents.

In some example embodiments the indicators of association include a difference in timing of one of the plurality of communications relative to another of the plurality of communications. By analysing the timings of communications relative to other communications enables the system to make estimates of what priority certain correspondents have over other correspondents. For example, if a first correspondent receives a message from a second correspondent, and then receives a message from a third correspondent, if the first correspondent replies to the third correspondent first, this is indicative that the first correspondent places a higher priority on the third correspondent than the second.

In some example embodiments the indicators of association include a quantity of correspondents associated with a communication. For example, if a communication between two correspondents also includes several others (for example, a group telephone call, email or chat) this may indicate a lower level of closeness than if only two correspondents were communicating.

In some example embodiments the indicators of association include a format of communication. A format of communication may, for example, distinguish between a call from a landline phone and a call from a mobile phone, where a call from a mobile phone may be indicative of a closer relationship to the receiving correspondent.

In some example embodiments the method further comprises: receiving digital content for each of the plurality of communications; and wherein said determining further comprises searching for content indicative of association. While the above embodiments propose using metadata to determine a measure of association, it is envisioned that in addition or instead of metadata, simple searches may be performed on the content itself to identify content indicative of association.

Metadata is a particularly promising source of indicators of association, as indicators within metadata can typically be identified in $O(1)$ time. Scanning content for simple indicators (such as words or phrases) can also be highly efficient and can be performed in $O(n)$ time, where n indicates the size of the communication (i.e. number of words or duration of a call). Where the contents of a communication has already been indexed, this search can even be performed in $O(1)$ time, leading to a very efficient search for indicators of association, even within the content.

Existing methods of reviewing communications typically involve human involvement or high complexity NLP techniques to comprehend the content of communications and establish the complex concept of levels of association. The proposed solution, however, rather than performing in-depth analysis of the content, performs simple searches for indicators of association, such as words or phrases. Therefore, the proposed solution offers a computationally inexpensive means of quantifying complex concepts from large amounts of data.

In some example embodiments the content indicative of association includes emotive content, wherein said emotive content includes one or more of: a sound of laughter, and an emoticon. Performing a search for emotive content is a computationally inexpensive way of identifying the nature of a communication and the level of association between correspondents.

In some example embodiments the content indicative of association includes an external link. Furthermore, the target of the external link may be a further indicator, with certain web domains indicating a higher measure of association between correspondents. For example, links to humorous web domains may indicate a higher level of closeness in the relationship between correspondents.

In some example embodiments the content indicative of association includes a meeting arrangement. Identifying whether a meeting arrangement is included in a communication can be performed by searching for certain keywords or phrases, or metadata with calendar invites. Communications with meeting arrangements can be indicative of a high level of importance for a communication, for example.

In some example embodiments the content indicative of association includes an urgency indicator. An indicator of urgency, such as the phrase "ASAP", or "deadline", may indicate that the email is of a high importance. Alternatively, or in addition, there may be an email-based flag or metadata that explicitly defines the email as an 'urgent' email.

In some example embodiments the content indicative of association includes an indication to change communication means. An indication to switch means of communication within an analysed communication may indicate a developed relationship between correspondents. For example, an email communication with information of phone number or meeting location may indicate an advancement of a relationship, and therefore indicate a higher measure of association between the correspondents.

In some example embodiments the content indicative of association includes detectably informal content, said detectably informal content comprising one or more of: spelling errors, and humour flags. Spelling errors are easily detectable, and dictionaries of humorous flags or words can be used to identify whether a communication contains informalities indicative of high closeness or low importance.

In some example embodiments the content indicative of association includes content in more than one language. Detecting evidence of multiple languages or languages other than a default language may indicate familiarity between correspondents.

In some example embodiments said determining comprises calculating a score based on weighted sums of said indicators of association. While many indicators of association may be used to easily and quickly evaluate levels of association between correspondents, using weightings (co-efficients) to adjust the contributions of different indicators can result in a more realistic and accurate measure of association.

In some example embodiments said score is further based on a weighted sum of quantity of content indicative of association. While many of the content indicative of association may be used to easily and quickly evaluate levels of association between correspondents, using weightings (co-efficients) to adjust the contributions of different indicators can result in a more realistic and accurate measure of association.

In some example embodiments weighting is determined by machine learning. The choice of weighting can have a large effect on the accuracy of the measure of association. For example, in some environments, the use of multiple languages in communications may indicate a high level of association between correspondents, whereas in environments where it is normal for different languages to be used, this indication should not be weighted as highly. Using machine learning to adjust the weightings provides an automatic and robust way of training the system to produce measures accurate for that specific use.

The weightings may be adjusted based on implementation (i.e. different companies) or on a per-user basis. While using indicators is a very fast and efficient way of interpreting complex characteristics, the use of weightings ensures that the results of these fast calculations are kept as accurate as possible. Indeed, if an indicator is incorporated into the solution under an incorrect assumption, the weightings can be adjusted to minimise or even reverse the effect of the indicator on the measure of association. Machine learning systems are particularly proficient at automatically adjusting the weightings in this way based on training data.

In some example embodiments one of the measures of association is a measure of closeness of relationship between the first and second correspondent. Measuring the closeness of a relationship between correspondents enables the end user to quantitatively define the rapport between two users. Such information can be useful in identifying employees that are spending too long communication with friends and family members without needing any prior knowledge of the friends and family members of the employee. Furthermore, such information could also be used to measure developing or diminishing levels of rapport between employees and important clients, for example, and therefore could be used for performance assessment.

In some example embodiments one of the measures of association is a measure of importance of relationship between the first and second correspondent.

In some example embodiments the method further comprising determining one or more measures of association between the first correspondent and each of a plurality of correspondents. The proposed solution is envisioned to apply to communications between many different correspondents, such as between one employee and multiple external correspondents, or even all employees and all external (or internal correspondents). The efficiencies taught in the proposed solution allows for the proposed solution to assess a single relationship, or rolled out to cover an almost limitless number of relationships.

In some example embodiments the method further comprising: retrieving from memory the one or more measures of association corresponding to each of the plurality of correspondents; displaying on a display: a base icon representative of the first correspondent; and target icons corresponding to each of the plurality of correspondents, wherein the target icons are displayed with one or more attributes, each attribute being functionally dependent on one of the degrees of association of the corresponding correspondent.

By assigning a different attribute to each measure of association allows an end user to easily interpret the large amounts of information related to each correspondent in an easy to interpret manner. By graphically representing the first correspondent with one icon and displaying the communicating correspondents as other icons, where the properties of the other icons vary with measure of association provides a simple, but information-dense, output of the proposed solution.

In some example embodiments the attribute is a distance of the target icon from the base icon.

In some example embodiments the attribute is a size of the target icon.

In some example embodiments the attribute is a colour of the target icon.

Using distance, size and colour as attributes for representing different measures of association provides the user with visibly distinct properties to look for when interpreting the multi-variable data. At a glance, the user can determine based on positioning, or based on size, or based on colour, the nature of three different measures of association, if required.

According to another aspect of the present invention, the applicant makes available a computer system comprising: one or more processors; and memory comprising instructions which when executed by the one or more processors cause the computer system to: receive metadata for each of the plurality of communications; determine one or more measures of association between the first and second correspondent, wherein said determining comprises identifying one or more indicators of association in said metadata; and store in memory the one or more measures of association between the first and second correspondence.

In some example embodiments the memory comprises further instructions to cause the method of any of the methods described above.

According to another aspect of the present invention, the applicant makes available a non-transitory computer readable medium having computer executable instructions stored thereon for implementing a method, the method comprising: receiving metadata for each of the plurality of communications; determining one or more measures of association between the first and second correspondent, wherein said determining comprises identifying one or more indicators of association in said metadata; and storing in memory the one or more measures of association between the first and second correspondence.

In some example embodiments the computer executable instructions are further configured to cause the method of any of the methods described above.

According to another aspect of the present invention, the applicant makes available a computer implemented method for monitoring associations between a base correspondent and one or more target correspondents, the method comprising: retrieving from memory one or more measures of association corresponding to each target correspondent; displaying on a display: a base icon representative of the base correspondent; target icons corresponding to each of the one or more target correspondents, wherein the target icons are displayed with one or more attributes, each attribute being functionally dependent on one of the measures of association of the corresponding target correspondent; and a filter option for each of the measures of association; and in response to user input at one of the filter options, adjusting a threshold of the measure of association corresponding to the filter option, and adapting the display to display target icons that have a measure of association within the threshold.

One problem with the large amounts of communication data now available to companies and managers is finding an intuitive way of allowing the user to interact with and process the information in a meaningful way.

By assigning a different attribute to each measure of association allows an end user to easily interpret the large amounts of information related to each correspondent in an easy to interpret manner. By graphically representing the target correspondent with one icon and displaying the communicating correspondents as other icons, where the properties of the other icons vary with measure of association provides a simple, but information-dense, output of the proposed solution.

Furthermore, filter options are provided that not only allow for targeted filtering of data, but also enables the user to easily understand the significance of different attributes. The proposed solution provides different filter options associated with each measure of association, and adjusts which icons are displayed, based on thresholds controlled by user input applied to the filter options. As each measure of association also corresponds to specific attributes, by applying user input to different filter options, the user will quickly see that certain attributes are connected with certain filter options. For example, where the attribute indicating a first measure of association is distance from a centre, the user will easily identify that altering the filter option for the first measure of association results in the removal of the most distant icons first, thereby immediately showing the user how different attributes relate to different measure of association.

In some example embodiments the attribute is a distance of the target icon from the base icon.

In some example embodiments the attribute is a size of the target icon.

In some example embodiments the attribute is a colour of the target icon.

Using distance, size and colour as attributes for representing different measures of association provides the user with visibly distinct properties to look for when interpreting the multi-variable data. At a glance, the user can determine based on positioning, or based on size, or based on colour, the nature of three different measures of association, if required.

In some example embodiments any of the measures of association are any of: a measure of closeness of relationship between the base correspondent and a target correspondent; a measure of importance of relationship between the base correspondent and a target correspondent; and a measure of the quantity of communications between the base correspondent and a target correspondent.

In some example embodiments one or more filter options are sliders.

In some example embodiments one or more filter options are dropdown boxes

In some example embodiments said adapting the display comprises animating the target icons to appear or disappear from the display. Using animations may accentuate the effects of user input on the different filter options, thereby providing the end user a clearer indication of how the user interface operates.

In some example embodiments the base and target icons each comprise a circle with text indicative of the corresponding correspondent.

According to another aspect of the present invention, the applicant makes available a computer system for monitoring associations between a base correspondent and one or more target correspondents, comprising: one or more processors; and memory comprising instructions which when executed by the one or more processors cause the computer system to: retrieve from memory one or more measures of association corresponding to each target correspondent; display on a display: a base icon representative of the base correspondent; target icons corresponding to each of the one or more target correspondents, wherein the target icons are displayed with one or more attributes, each attribute being functionally dependent on one of the measures of association of the corresponding target correspondent; and a filter option for each of the measures of association; and in response to user input at one of the filter options, adjust a threshold of the measure of association corresponding to the filter option, and adapt the display to display target icons that have a measure of association within the threshold.

In some example embodiments the memory comprises further instructions to cause the method of any of the methods described above.

According to another aspect of the present invention, the applicant makes available a non-transitory computer readable medium for monitoring associations between a base correspondent and one or more target correspondents, the non-transitory computer readable medium having computer executable instructions stored thereon for implementing a method, the method comprising: retrieving from memory one or more measures of association corresponding to each target correspondent; displaying on a display: a base icon representative of the base correspondent; target icons corresponding to each of the one or more target correspondents, wherein the target icons are displayed with one or more attributes, each attribute being functionally dependent on one of the measures of association of the corresponding target correspondent; and a filter option for each of the measures of association; and in response to user input at one of the filter options, adjusting a threshold of the measure of association corresponding to the filter option, and adapting the display to display target icons that have a measure of association within the threshold.

In some example embodiments the computer executable instructions are further configured to cause the method of any of the methods described above.

According to another aspect of the present invention, the applicant makes available a computer-implemented method of ranking closeness (the degree of friendliness and informality in correspondence and its recurring nature) and importance of relationships (the degree of person's reliance on the relationship in obtaining valuable mission-critical information required for or beneficial to performing duties and doing business) between persons as demonstrated in the correspondence between them stored on a digital computer and a user interface mechanism to visualise a person's network of contacts on the basis of their measured closeness and importance scores, relevance to a context and the total volume of such correspondence and to filter such visualisation on the basis of threshold values set for each relationship parameter.

According to another aspect of the present invention, the applicant makes available a method for evaluating closeness score of a phone call between two individuals that takes into account laughter in a phone call, engagement of individuals in the call, time of the call if placed outside of business hours, arrangement of meeting after office hours during the call, informal language used in the phone call and mobile phone number used to place/receive the call;

According to another aspect of the present invention, the applicant makes available a method for evaluating closeness score of an email sent by an individual to another individual that takes into account humorous content contained in the email, emoticons contained in the email, informal language used in the email, spelling errors contained in the email, usage of multiple spoken languages used in the email, images contained in attachments to emails and external web links contained in the email;

According to another aspect of the present invention, the applicant makes available a method for evaluating closeness score of a daily log of electronic messaging conversation between two individuals over electronic messaging conversations such as chat rooms, that splits a daily conversation log into separate conversations on the basis of time intervals between subsequent messages sent and received, takes into account possession of each such conversation by each of the individuals in question, duration of each such conversation, invitations to switch to or follow-up using other information exchange media, time of the conversation if it took place outside of business hours, humorous content contained in each such conversation, emoticons contained in each such conversation, informal language used in each such conversation, spelling errors made by each of the individuals in each such conversation, multiple spoken languages used in each such conversation, external web links contained in each such conversations and usage of persistent chat room for each such conversation;

According to another aspect of the present invention, the applicant makes available a method for evaluating closeness score of all phone communications between two individuals over a period of time ("observation period") that takes account of closeness score for each phone call between these individuals placed during the observation period, total number of calls between individuals placed during the observation period, ratio of placed/received calls for each of the individuals in relation to each other and average duration of the calls between individuals compared to average duration of all phone calls they made during the observation period;

According to another aspect of the present invention, the applicant makes available a method for evaluating closeness score of all email communications between two individuals over a period of time ("observation period") that takes account of closeness score for each email sent by one of those individuals to another during the observation period, total number of emails sent by each of the individuals to each other, groups of emails that were sent as a response to an email and that share the same email subject ("email thread"), number of such threads and number of emails in each such thread that occurred during the observation period;

According to another aspect of the present invention, the applicant makes available a method for evaluating closeness score all of communications between two individuals conducted via electronic message services such as chat rooms over a period of time ("observation period") that takes account of closeness score for each daily log of conversations via such message services and number of occurrences of such conversations during the observation period; and According to another aspect of the present invention, the applicant makes available a method for evaluating overall closeness of communications between two individuals across all communications channels over a period of time ("observation period") that takes account of closeness score of all phone communications between those individuals over the observation period, closeness score of all email communications between those individuals over the observation period and closeness score of all of communications between two individuals conducted via electronic message services such as chat rooms over the observation period.

According to another aspect of the present invention, the applicant makes available a method for evaluating importance score of a phone call between two individuals that takes into account duration of the call if placed/received during a special period, time of the call if placed/received during a special period, time of the call if placed outside of business hours, arrangement of meeting during the call and whether the call was preceded by a conversation conducted via another form of communication and in which the call was scheduled;

According to another aspect of the present invention, the applicant makes available a method for evaluating importance score of an email sent by an individual to another individual that takes into account whether the email was a reply to another email between individuals and if so time difference between these emails, whether the email was sent during a special period, whether such reply was prioritised over replies to other emails arrived at the same period of time; length of the email, urgency of the email, whether the email was sent during early/late hours, whether the email was originated outside of business hours, meetings arranged via this email and whether the email contained a request to switch to other another mode of communication;

According to another aspect of the present invention, the applicant makes available a method for evaluating importance score of a daily log of electronic messaging conversation between two individuals over electronic messaging conversations such as chat rooms, that splits a daily conversation log into separate conversations on the basis of time intervals between subsequent messages sent and received, takes into account whether the non-persistent chat was initiated, amount of participants in the conversation, participation during special time periods, participants' latency, initiation of private chat from a group chat, call to action or urgent messages, time of individual conversations which took place outside of business hours, meetings arranged in this conversation and invitations to switch to another mode of communication;

According to another aspect of the present invention, the applicant makes available a method for evaluating importance score of all phone communications between two individuals over a period of time ("observation period") that takes into account importance score for each phone call between these individuals placed during the observation period;

According to another aspect of the present invention, the applicant makes available a method for evaluating importance score of all email communications between two individuals over a period of time ("observation period") that takes account of importance score for each email sent by one of those individuals to another during the observation period, total number of emails sent by each of the individuals to each other, groups of emails that were sent as a response to an email and that share the same email subject ("email thread"), number of emails forming such groups and difference in time of origination of emails forming such groups;

According to another aspect of the present invention, the applicant makes available a method for evaluating importance score all of communications between two individuals conducted via electronic message services such as chat rooms over a period of time ("observation period") that takes account of importance score for each daily log of such conversations;

According to another aspect of the present invention, the applicant makes available a method for evaluating overall importance of communications between two individuals across all communications channels over a period of time ("observation period") that takes account of importance score of all phone communications between those individuals over the observation period, importance score of all email communications between those individuals over the observation period and importance score of all of communications between two individuals conducted via electronic message services such as chat rooms over the observation period;

According to another aspect of the present invention, the applicant makes available a user interface for visualising closeness and importance of communications between an individual and its contacts that draws a relationships graph where contacts are represented as vertices and their relationships are represented as edges and the colours of vertices on the basis of closeness score, importance score, relevance to a particular context and the total volume of communications between the individual and each person for whom the computer stores at least one record of correspondence with the individual and filtering the visualisation of such relationships through setting threshold for each parameter.

BRIEF DESCRIPTION OF DRAWINGS

Examples of the invention will now be described in detail with reference to the accompanying drawings, in which:

FIG. 15 illustrates a user interface for visualising and filtering relationships between persons on the basis of closeness, importance, context and volume of correspondence between.

DETAILED DESCRIPTION

Figure 1:
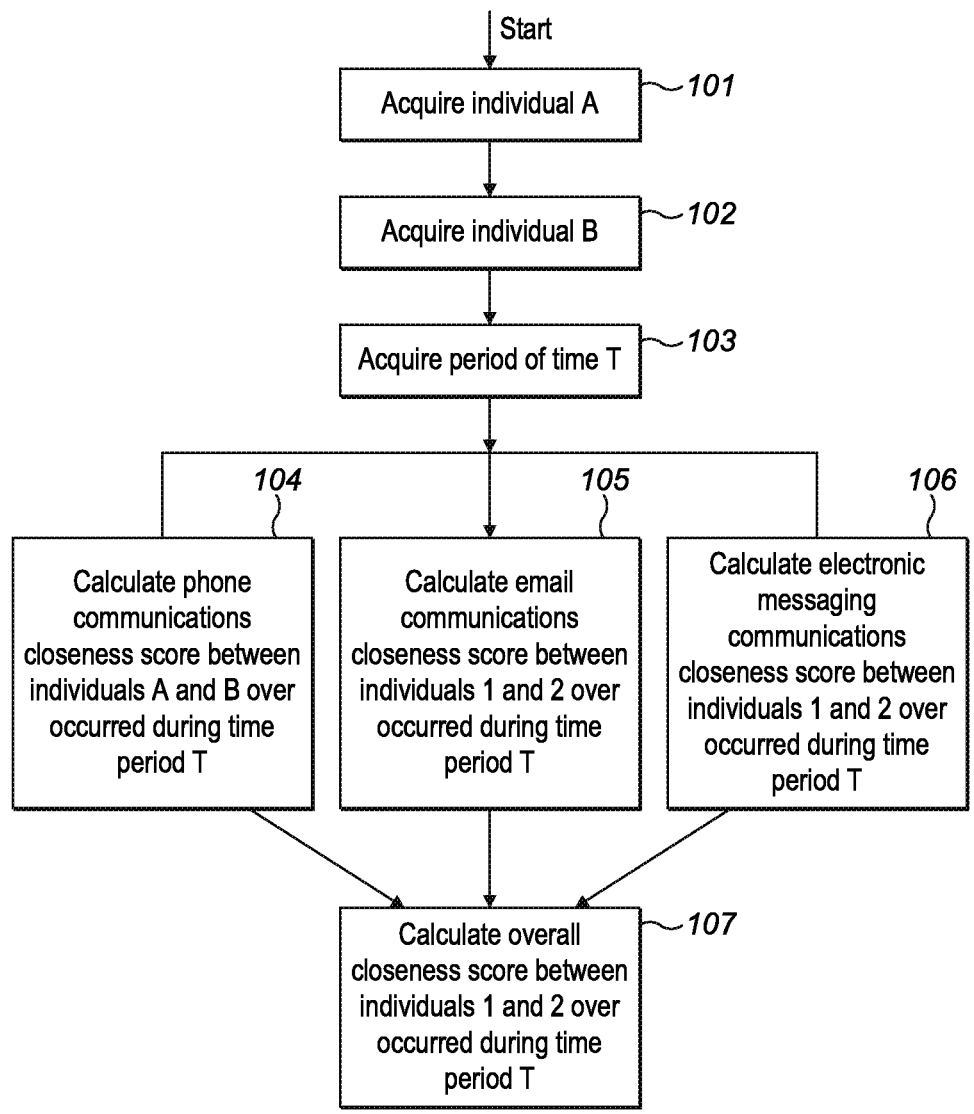
FIG. 1 is a flow chart illustrating the method for evaluating closeness score for combined communications between individuals over a period of time.

The proposed solution provides a computationally efficient way of automatically determining measure of association between correspondents. The level of association between correspondents has typically been difficult to quantify, as the traditional approach requires complex language processing or human involvement to interpret the complex nature of human interactions. However, the proposed approach uses simple indicators or flags to identify evidence of high or low measures of association between correspondents.

These indicators may be found in the metadata associated with communications, and/or may be found within the content of communications. Searching for simple identifiers provides a much more computationally efficient system than a brute force approach of attempting to comprehend the entire contents of communications. Different indicators can indicate different types of associations between correspondents, and identifying combinations and patterns of indicators can lead to very accurate results, despite the low computational costs.

The proposed system is envisioned to be effective for all types of communications, and goes beyond the specific examples of indicators provided and the types of associations measured. The example embodiment provided below describes methods of establishing the levels of closeness between correspondents and the importance of their relationship based on certain identifiers in metadata or in the content of communications. However, it would be clear to the skilled person that the proposed solution is not limited to the combinations and examples provided in the Figures and detailed description provided herein.

FIGS. 1 to 7 outline the steps of an example embodiment where the 'closeness' of two correspondents is established by the proposed system. Automatically establishing a quantitative measure of the closeness of two communicating correspondents can be useful to managers of large teams of people.

For example, it could enable the manager to determine whether an employee is spending their time talking to friends or to work-related individuals. It could also help establish how the relationship between an employee and a work colleague is increasing and diminishing by developing a quantitative measure of rapport.

The absolute quantified measure of closeness may be useful to an end user, but the change in closeness score over time may be even more useful. By monitoring how a measure of closeness of two individuals changes over time, or how employees spend more or less time talking to friends at work may be useful indicators of behavioural trends to managers.

FIGS. 8 to 14 outline the steps of an example embodiment where the importance of two correspondents is established by the proposed system. Automatically establishing a quantitative measure of the importance of two communicating correspondents can be useful to managers of large teams of people.

While the closeness measure may be a good indicator of rapport between individuals, the importance measure may be used to identify how important the relationship is between individuals. The proposed solution is designed to identify whether an employee is talking to an important client or superior, or to an outside acquaintance, based almost entirely on an automatic analysis of the communications.

The closeness score can be treated as one measure of association, while the importance score can be treated as another measure of association. A high closeness and importance score for one combination of individuals may indicate that an employee has a good rapport with an important user (like a client), whereas a high closeness and a low importance score may indicate that an employee is spending too many work hours talking with friends.

The closeness and importance scores are only examples of measures of association that the proposed solution can determine, and envisioned implementations may incorporate any one or more the two measures and may include other measures in addition or instead of closeness and importance scores. What the proposed system provides is an automatic efficient way of automatically finding a quantifiable measure of characteristics that are typically very difficult to determine, especially through computing means.

Figure 15:
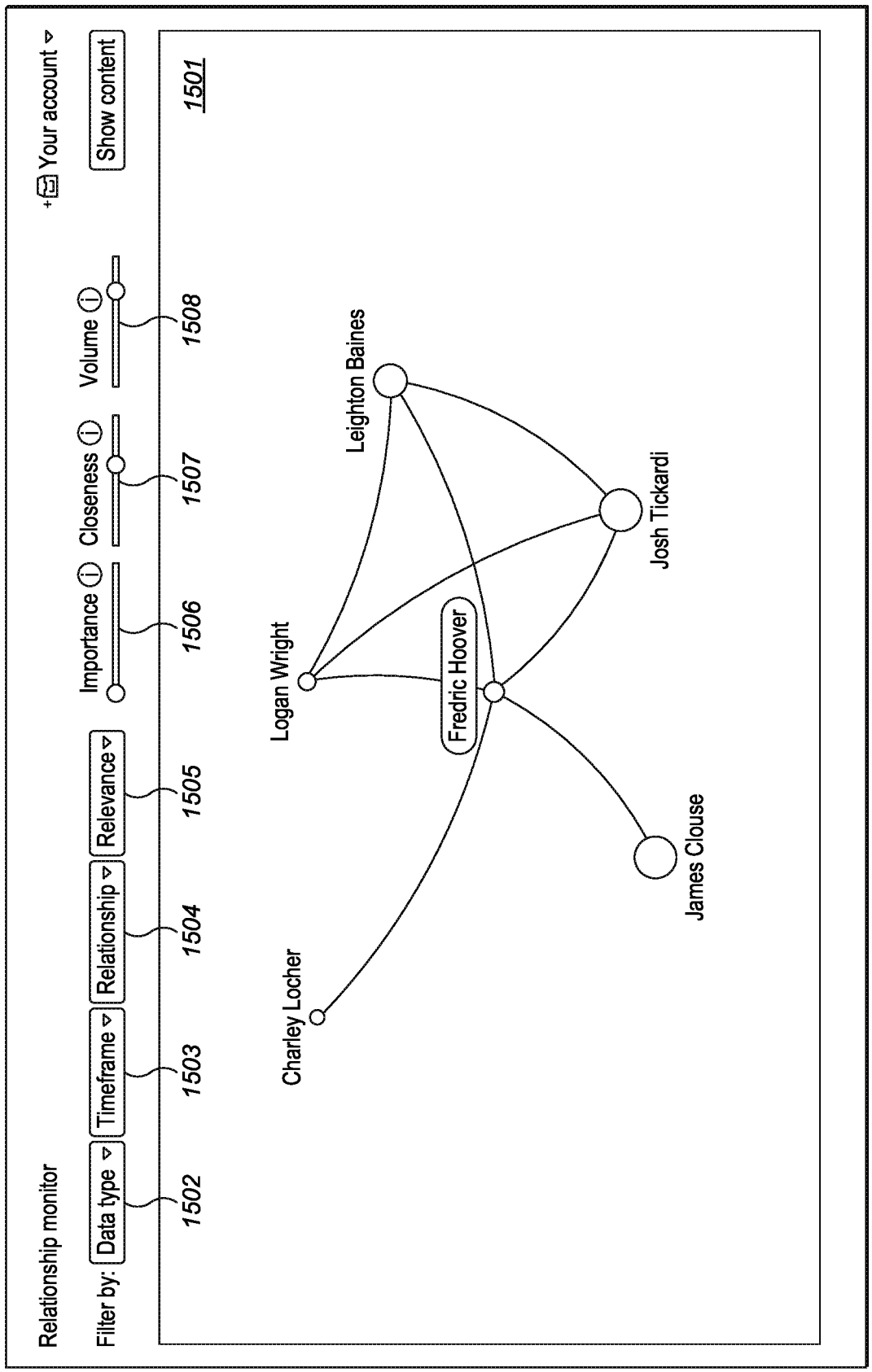
Figure 16:
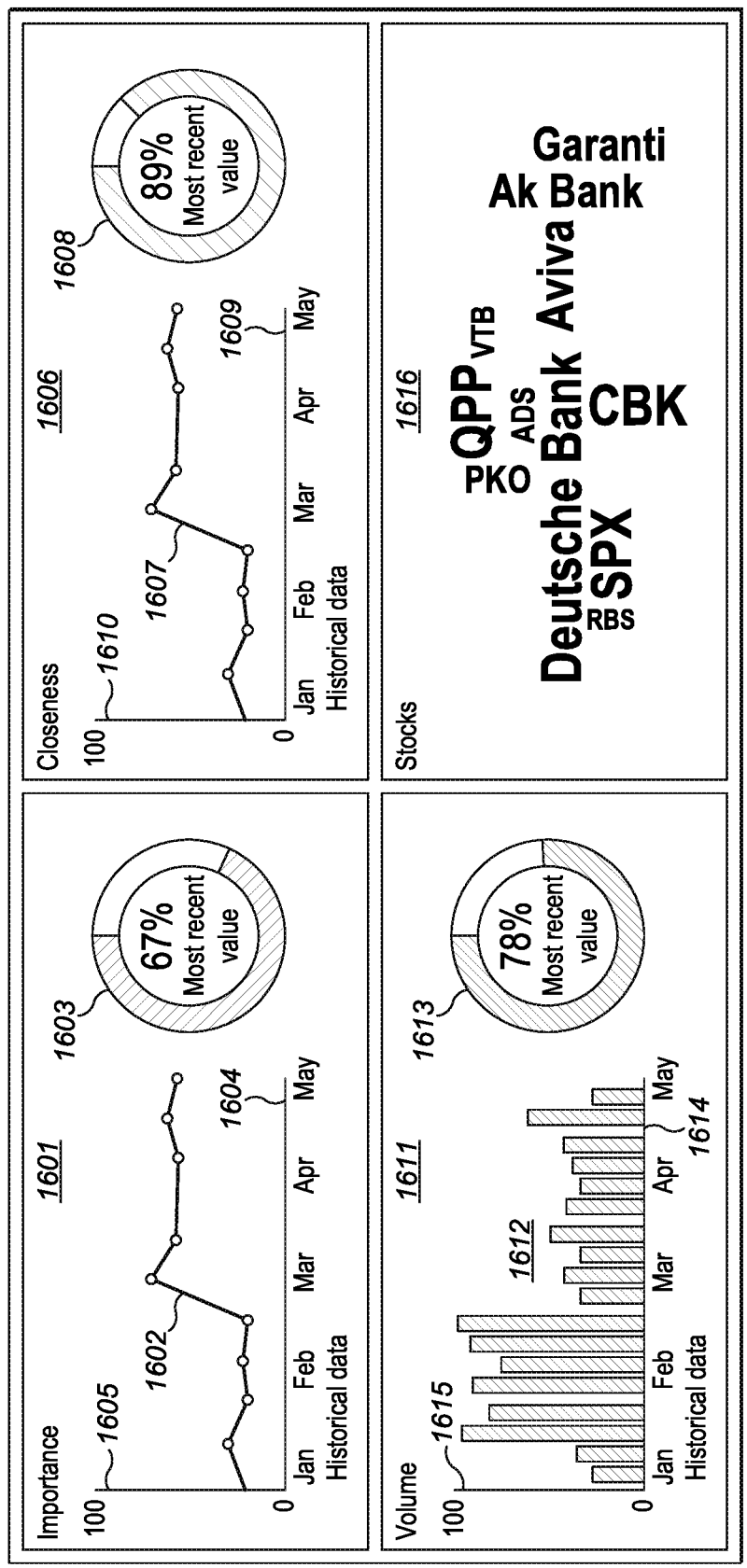
FIG. 16 illustrates a user interface for visualising the results of quantification of relationships between two persons through closeness and importance scores, estimation of the total volume of correspondence and trending words and phrases.

FIGS. 15 and 16 show an example User Interface for displaying and interacting with the results of determining measures of association between individuals. While the proposed solution is envisioned to be capable of processing boundless amounts of communications, presenting the results of this data to an end user in a meaningful way is one of the challenges resolved by the proposed solution, and will be discussed in more detail in the detailed description of FIGS. 15 and 16.

Turning now to FIG. 1, the flowchart provided in FIG. 1 illustrates a proposed method of determining a measure of association between two correspondents. In this example embodiment, the measure of association is the level of closeness between the two individuals over a period of time. FIG. 1 identifies the following steps:

Step 101: individual A is selected by the user, where the user is in a position to monitor and interpret the communications between individuals within the system.

Step 102: individual B is selected by the user.

Step 103: period of time is selected by the user.

Figure 2:
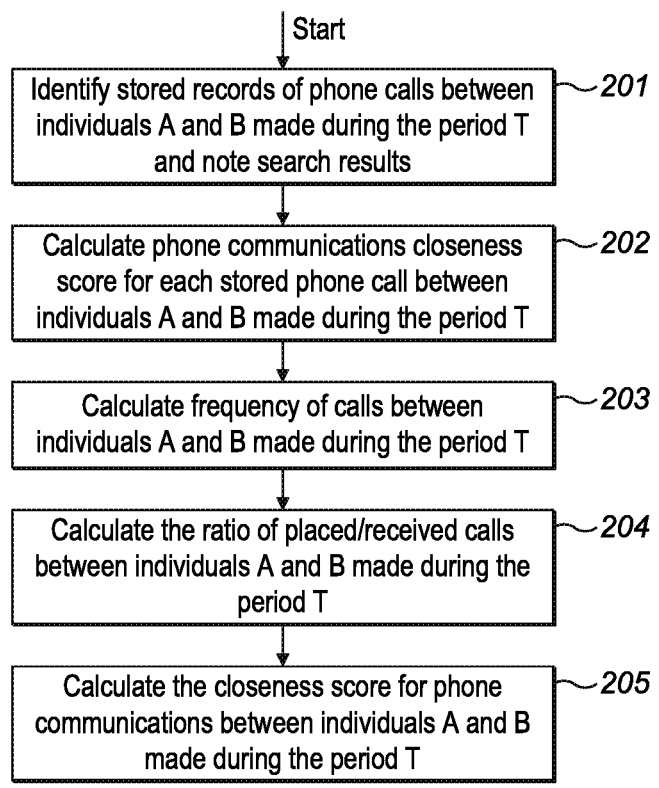
FIG. 2 is a flow chart illustrating the method for evaluating closeness score for phone communications between individuals over a period of time.

Step 104: closeness score for phone communications between individuals A and B over time period T is calculated according to the method illustrated in FIG. 2 steps 201 to 205.

Figure 3:
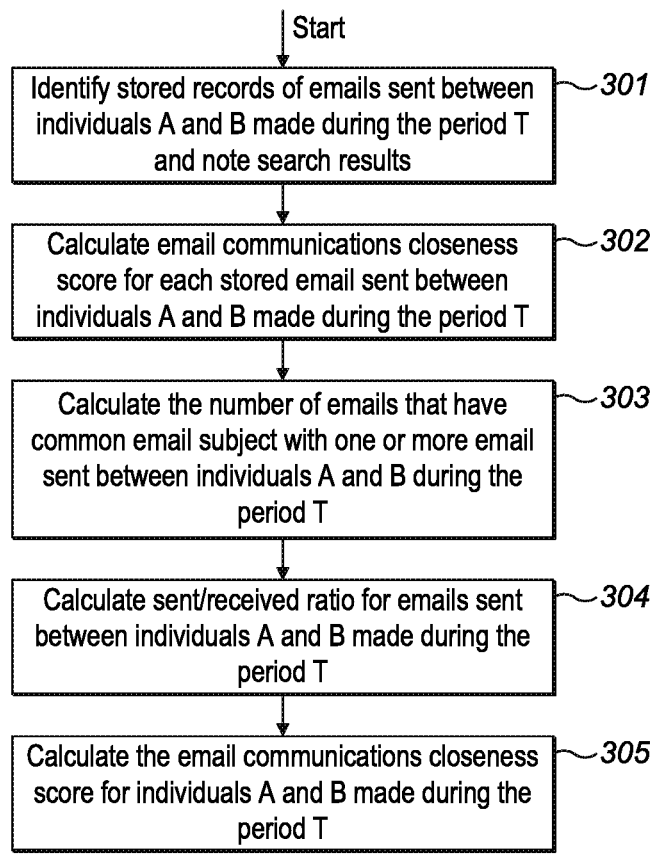
FIG. 3 is a flow chart illustrating the method for evaluating closeness score for email communications between individuals over a period of time.

Step 105: closeness score for email communications between individuals A and B over time period T is calculated according to the method illustrated in FIG. 3 steps 301 to 305.

Figure 4:
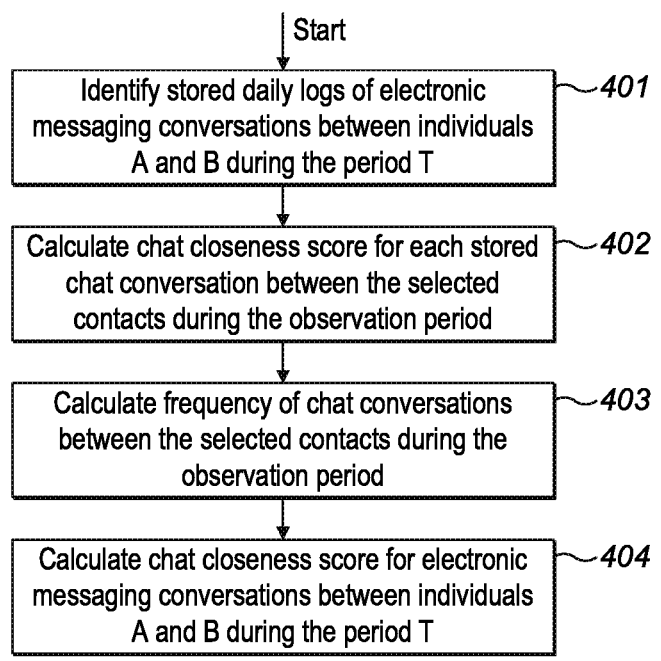
FIG. 4 is a flow chart illustrating the method for evaluating closeness score for electronic messaging communications between individuals over a period of time.

Step 106: closeness score for electronic messaging communications between individuals A and B over time period T is calculated according to the method presented on FIG. 4 through steps 401-404. Electronic messaging communications may be, for exampling, instant messaging or chat communication.

Step 107: closeness score for relationship between individuals A and B over time period T is calculated as:

$$CS(A,B,T)=k_p*S_p(A,B,T)+k_e*S_e(A,B,T)+k_m*S_m(A,B,T)$$

Here, $CS(A,B,T)$ is the overall closeness score for relationship between individuals A and B over time period T and takes into account the closeness scores of various means of communication, such as phone $S_p(A,B,T)$, email $S_e(A,B,T)$, and electronic messaging $S_m(A,B,T)$.

$S_p(A,B,T)$ is the closeness score for phone communications between individuals A and B over time period T calculated at step 104, and $k_p$ is a coefficient corresponding to closeness score for phone communications. $S_e(A,B,T)$ is the closeness score for email communications between individuals A and B over time period T calculated at step 105, and $k_e$ is a coefficient corresponding to closeness score for email communications. $S_m(A,B,T)$ is the closeness score for electronic messaging communications between individuals A and B over time period T calculated at step 106, and $k_m$ is a coefficient corresponding to electronic messaging closeness score for phone communications.

Values of coefficients can be assigned either empirically or through various machine learning techniques.

The score therefore represents a mix of behavioural inputs from different communication channels weighted according to their significance e.g. phone calls can be deemed more significant in determining the overall relationship closeness as they tend to contain richer behavioural context that is attributed to closeness like laughter, anger.

The system may train itself against known relationships in order to determine an optimum combination of coefficients. In different scenarios, different coefficients may be used. For example, in companies where most communications are performed by email, while phone calls are rare, a higher coefficient may be assigned to the phone score compared to other scenarios.

Steps 104-106 can be performed in any order, both consequently and concurrently.

FIG. 2 illustrates a method for evaluating closeness of phone communications between individuals A and B over time period T:

Step 201: data storage (e.g. electronic database) is searched for records of phone calls placed within the time period T and in which either A is the dialler and B is the recipient of the call or vice versa. The output of the search may be metadata associated with the calls, the content of the calls, or both. Such metadata may include start and end times of the call, while content may comprise an audio recording or a transcript of the call.

Figure 5:
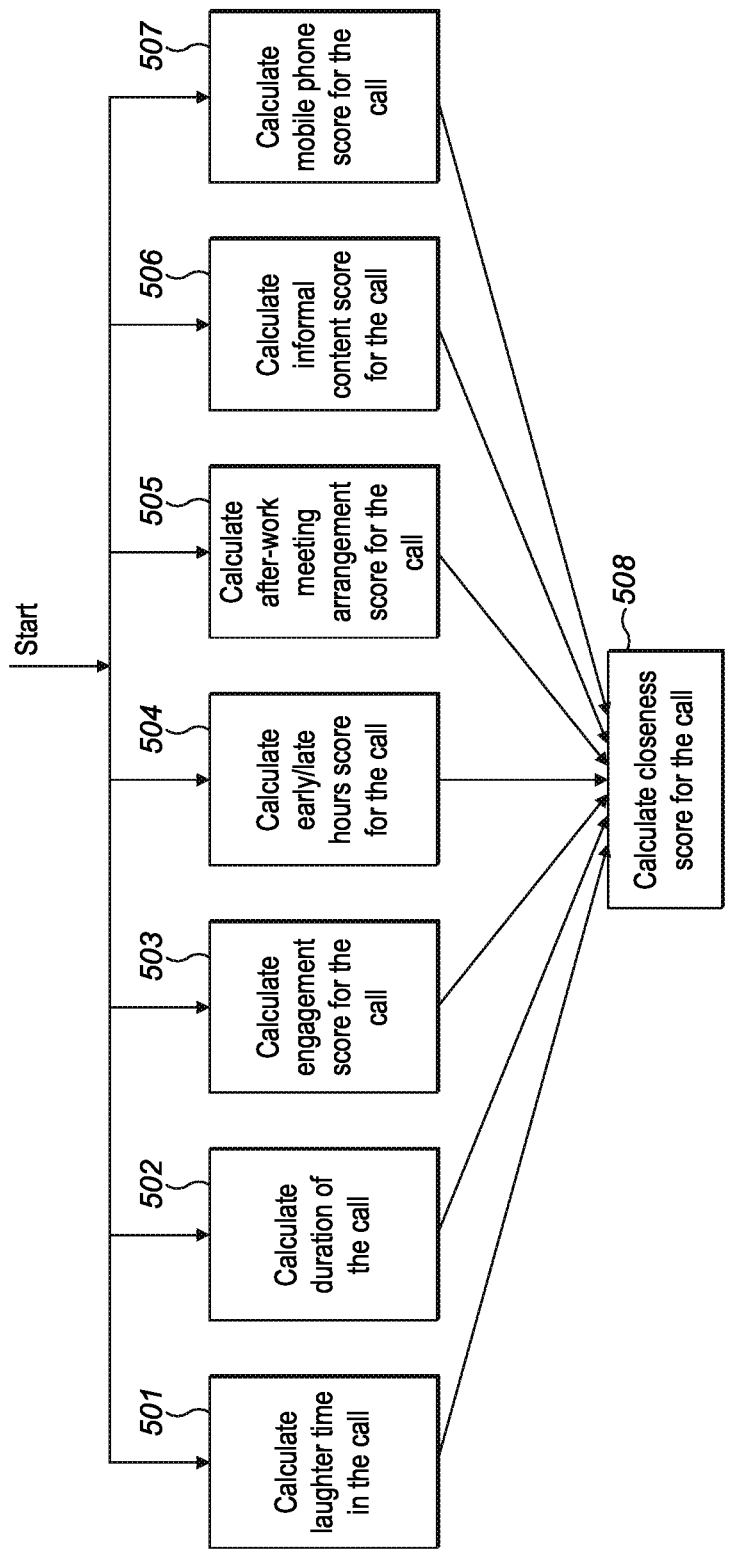
FIG. 5 is a flow chart illustrating the method for evaluating closeness score for a phone call record.

Step 202: closeness score for each phone call record noted as a result of step 201 is calculated according to the method presented in FIG. 5 through steps 501-508.

Step 203: frequency of calls between A and B over time period T is calculated as the total number of phone call records noted as a result of step 201 divided by the number of days between the commencement and expiry of time period T.

Recurring phone calls between individuals that hint at a developed relationship may therefore contribute towards overall closeness of phone communications between individuals.

Step 204: placed/received calls ratio is calculated as a total number of phone call records noted as a result of step 201 in which A placed the call divided by the total number of such phone call records in which A received the call if the former is less than the latter and as a total number of phone call records noted as a result of step 201 in which B placed the call divided by the total number of such phone call records in which B received the call if not.

Therefore more balanced communications over the phone where both participants regularly call each other will contribute a higher score than communications than one-way communications e.g. where a salesperson regularly calls a manager advertising new products and promotions but rarely receives a call back.

Step 205: closeness of phone communications between individuals A and B over time period T is calculated as:

$$S_p(A, B, T) = k_s * \frac{\sum_{i=1}^{n} S_{pi}(P_i)}{n} + k_f * F(n, T) + k_r * R(A, B, T)$$

where $S_p(A,B,T)$ is closeness of phone communications between individuals A and B over time period T, n is the number of phone call records $P_i$ noted as a result of step 201. $S_{pi}(P_i)$ is the closeness score for a phone call record $P_i$ calculated as a result of step 202, and $k_s$ is a coefficient corresponding to the sum of closeness scores for each noted phone call record. $F(n,T)$ is the frequency of calls between A and B during time period T calculated at step 203, $k_f$ is a coefficient corresponding to frequency of calls between A and B during time period T, $R(A,B,T)$ is the placed/received calls ratio calculated at step 204, $k_r$ is a coefficient corresponding to the placed/received calls ratio.

Values of coefficients can be assigned either empirically or through various machine learning techniques.

The score therefore represents a mixture of average closeness score of individual phone calls between two individuals and the scores evaluating the nature of participants' phone calling behaviour such as tendency to call each other regularly and return calls.

FIG. 3 illustrates a method for evaluating closeness of email communications between individuals A and B over time period T:

Step 301: data storage (e.g. electronic database) is searched for emails originated within the time period T and in which either A is the sender and B is the recipient of the email or vice versa and the results of the search, i.e. individual emails, are noted.

Figure 6:
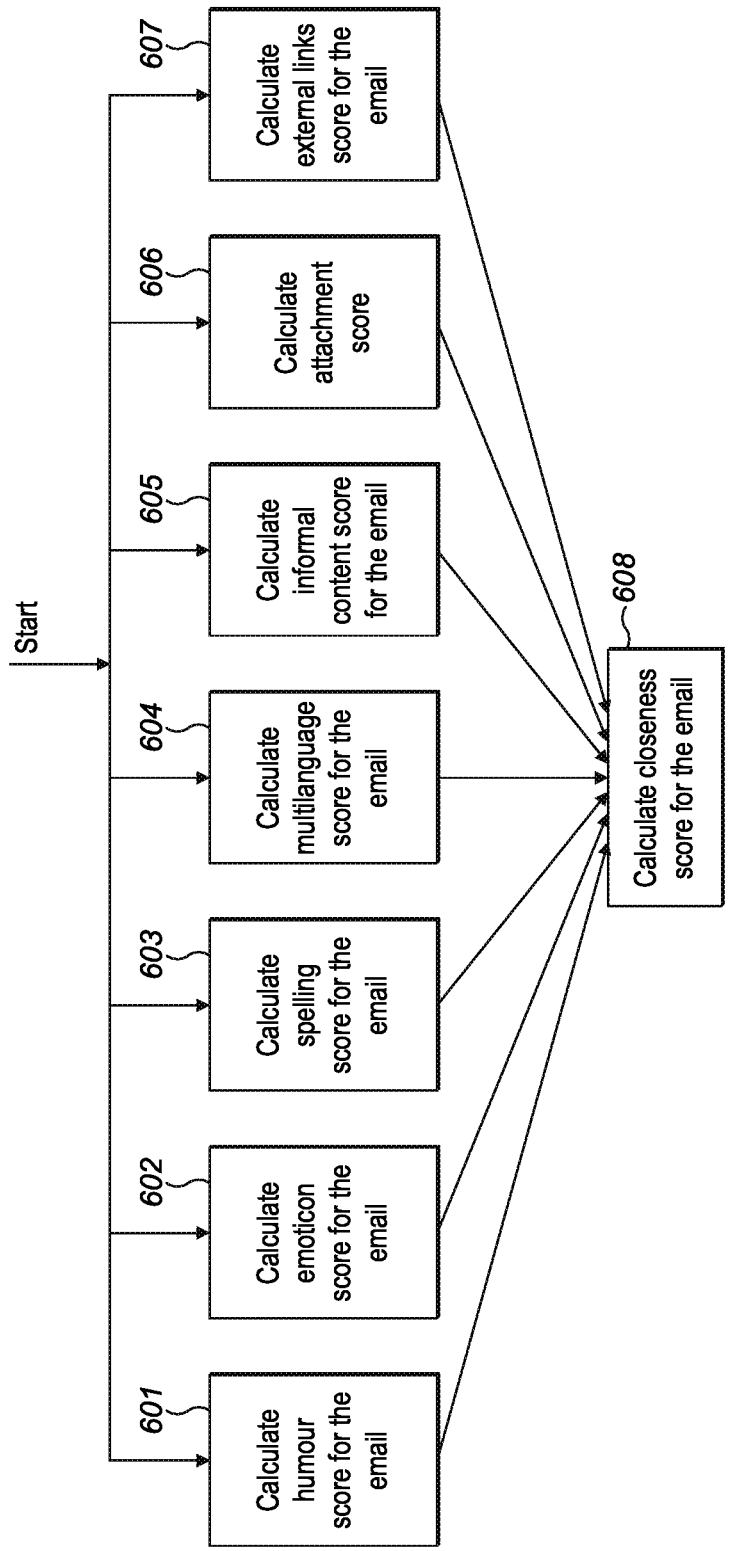
FIG. 6 is a flow chart illustrating the method for evaluating closeness score for an email.

Step 302: closeness score for each email noted as a result of step 301 is calculated according to the method presented in FIG. 6 through steps 601-608.

Step 303: number of emails sharing the common email subject is calculated as a total number of emails from those noted as a result of step 301 that have a common email subject. The common email subject can be identified either through an empirically derived set of rules (e.g. if email's subject field contains a phrase with any number of "re:" and "fwd:" prefixes) or by applying algorithms that aim to reconstruct the chronology of email correspondence by comparing and matching email address, time sent, and email content.

The score hence captures and evaluates sequences of email exchanges between two individuals revolving around the same topic. This indicates a closer relationship where correspondents are more driven to reply to an email including acknowledging receipt or thanking for the information provided and indicates that they are less prone to ignoring emails from this correspondent.

Step 304: sent/received calls ratio is calculated as total number of emails noted as a result of step 301 in which A was the sender divided by the total number of such emails in which A was the recipient if the former is fewer than the latter, otherwise as total number of emails noted as a result of step 301 in which B was the sender divided by the total number of such emails in which B was the recipient.

The score measures how balanced the email communication between individuals is. The more balanced communications may be valued higher as they represent a more engaged relationship compared to one-way communications, such as one where an analyst regularly emails an investor about new investment opportunities but rarely receives a reply.

Step 305: closeness of email communications between individuals A and B over time period T is calculated as:

$$S_e(A, B, T) = k_e * \frac{\sum_{i=1}^{n} S_{ei}(E_i)}{n} + k_c * C(A, B, T) + k_r * R(A, B, T)$$

where $S_e(A,B,T)$ is closeness of email communications between individuals A and B over time period T, n is the number of emails $E_i$ noted as a result of step 301. $S_{ei}(E_i)$ is the closeness score for an email $E_i$ calculated as a result of step 302, and $k_e$ is a coefficient corresponding to the sum of closeness scores for each noted email. $C(A,B,T)$ is the number of emails sharing the common email subject calculated at step 303, and $k_c$ is a coefficient corresponding to number of emails between A and B over time period T sharing the common email subject. $R(A,B,T)$ is the sent/received emails ratio calculated at step 304, $k_r$ is a coefficient corresponding to the sent/received emails ratio.

Values of coefficients can be assigned either empirically or through various machine learning techniques.

The score therefore represents a mixture of average closeness of individual emails between two individuals and the scores evaluating the nature of correspondents' emailing behaviour such as tendency to reply to emails and provide information in return for the information received.

FIG. 4 illustrates a method for evaluating closeness of electronic messaging communications between individuals A and B over time period T:

Step 401: data storage (e.g. electronic database) is searched for daily logs conversations conducted via electronic messaging services (e.g. chat rooms) generated within the time period T and in which both A and B participated; the results of the search, i.e. daily logs, are noted.

Figure 7:
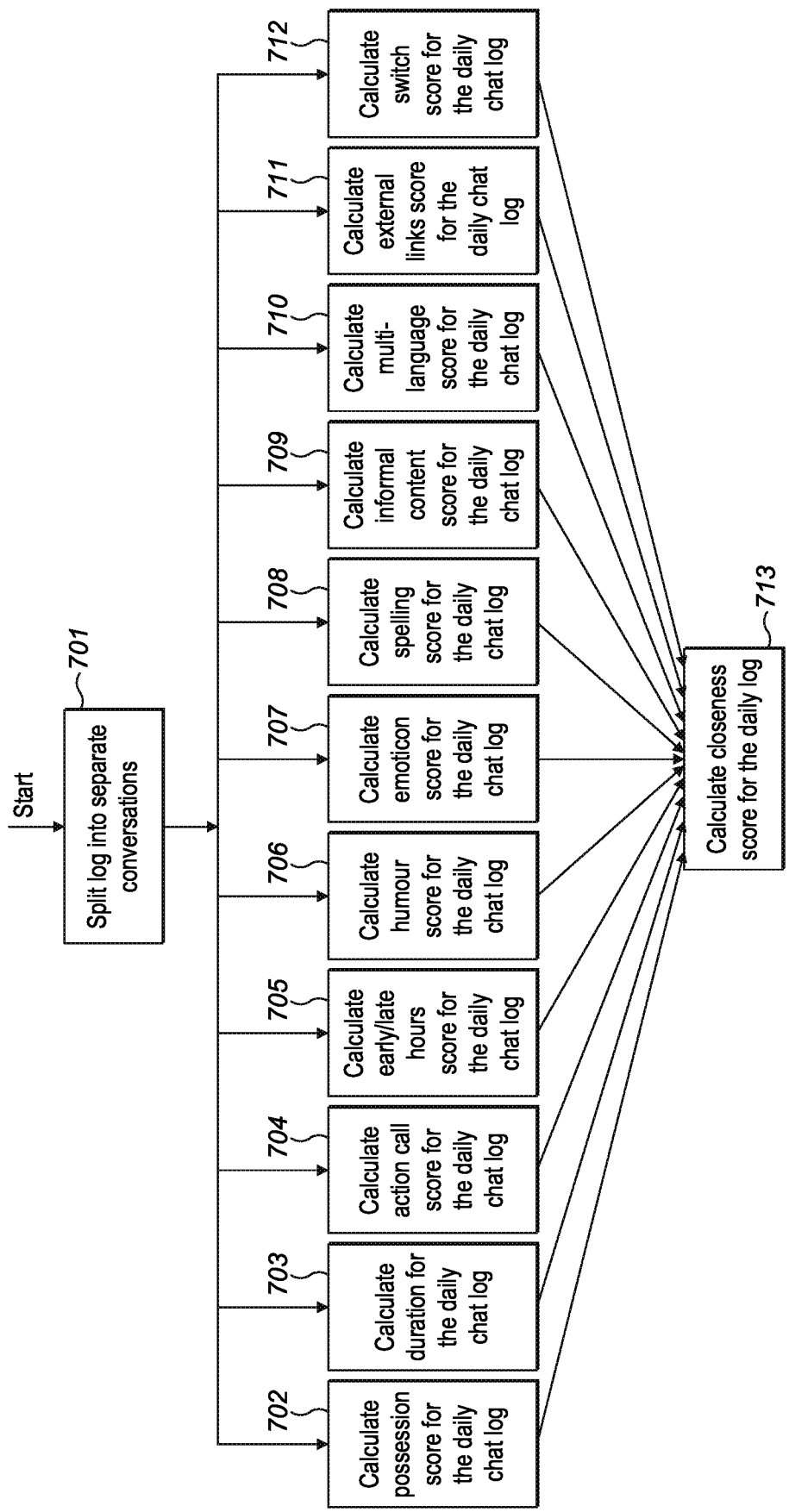
FIG. 7 is a flow chart illustrating the method for evaluating closeness score for an electronic messaging log.

Step 402: closeness score for each daily log noted as a result of step 401 is calculated according to the method presented in FIG. 7 through steps 701-713.

Step 403: frequency of electronic messaging conversations between A and B over time period T is calculated as the total number of daily logs noted as a result of step 401 divided by the number of days between the commencement and expiry of time period T.

Messaging on a recurring or a daily basis indicates a developed relationship between participants thus contributing towards overall closeness of instant messaging communications between individuals.

Step 404: closeness of electronic messaging communications between individuals A and B over time period T is calculated as:

$$S_m(A, B, T) = k_m * \frac{\sum_{i=1}^{n} S_{mi}(L_i)}{n} + k_f * F(n, T)$$

where $S_e(A,B,T)$ is closeness of electronic messaging communications between individuals A and B over time period T, n is the number of daily logs $L_i$ noted as a result of step 401, $S_{mi}(L_i)$ is the closeness score for a daily log $L_i$ as a result of step 302, $k_m$ is a coefficient corresponding to the sum of closeness scores for noted daily log, F(n,T) is the frequency of noted daily logs during time period T calculated at step 403 $k_f$ is a coefficient corresponding to the frequency of daily logs during time period T.

Values of coefficients can be assigned either empirically or through various machine learning techniques.

The score therefore represents a mixture of average closeness of individual daily logs of instant messaging conversations between two individuals and frequency of such conversations.

FIG. 5 illustrates a method for evaluating closeness of a phone call record:

Step 501: laughter time in a phone call is calculated as a sum of time lengths of all call fragments in which one or more speakers is laughing. Laughter can be identified by comparing a speaker's voice with patterns of speaking normally and laughing that can be constructed via guided machine learning techniques.

Laughter on the call implies friendliness and readiness to openly express emotions and therefore indicates a certain degree of relationship closeness between the speakers.

Step 502: duration of the call is calculated as total time passed from the start till the end of the call.

Longer calls may indicate that participants are interested and willing to dedicate significant time to exchange information therefore their relationship is closer than with those contacts the conversations with who are shorter.

Step 503: engagement score is calculated as total time participant A is speaking divided by the total time participant B is speaking if the former is longer than the letter and vice versa if otherwise.

Equal engagement of participants may indicate a more substantial interest in receiving and providing information and a more developed relationship between individuals as opposed to a more one-sided conversation e.g. a sales pitch over the phone where a salesperson is dominating and a potential customer is mostly silent and would only come back with questions even if interested at all in the offering.

Step 504: early/late hours score for the call is calculated as total time length of the call that took place after the close of business time plus time length of the call that took place before business opening time. Opening/Close of business time can be defined either as a constant e.g. 9 am to 5 p.m Monday to Friday or as a set of records in an electronic database specifying office hours for each person.

Calls placed outside of normal working hours are usually placed to a home or mobile number of a person who wouldn't find a call at such time inappropriate or placed to a direct line of a person who is expecting the call and staying late or coming early for this purpose. All such cases may hint at a developed relationship with a significant degree of closeness.

Step 505: after-work meeting arrangement score for the call is calculated as 1 in case the phone call contains an invitation by one of the speakers to another to meet in person after the close of business and 0 the record contains no such invitations. Invitation to meet is identified by matching a phrase in the call with an invitation pattern either through speech to text mechanisms or via direct voice pattern matching. Invitation pattern set can be produced either empirically or via guided machine learning techniques. Close of business time can be defined either as a constant e.g. 5 p.m Monday to Friday or as a set of records in an electronic database specifying office hours for each person.

Meetings outside of office hours are usually of personal or at least semi-formal nature and imply a certain degree of closeness between invitees, thereby contributing to the overall closeness of the call.

Step 506: informal content score is calculated is a total number of informal phrases used by both speakers in the phone call. Informal phrases are identified by matching a phrase in the call with an informal phrase pattern either through speech to text mechanisms or via direct voice pattern matching. Informal phrase pattern set can be produced either empirically, using an electronic slang dictionary or via guided machine learning techniques.

Using slang and explicit language is unusual and strongly discouraged in formal communication, therefore calls containing such informal content typically imply sufficient closeness of relationship that allows such informality.

Step 507: mobile phone score is calculated as 1 in case the call was placed or received by a mobile phone as per phone call record metadata in the electronic data storage containing it and 0 no such match could be found. Attribution of a phone number to a mobile network could be done via an electronic database of prefixes used by mobile network operators compiled either empirically or via guided machine learning techniques.

Step 508: phone call record closeness score is calculated as $$S_{pi}(P_i) = k_l * L + k_d * D + k_e * E + k_h * H + k_m * M + k_c * C + k_t * T$$

where $S_{pi}(P_i)$ is the closeness score of phone call $P_i$, L is laughter time calculated as a result of step 501, and $k_l$ is a coefficient corresponding to laughter time. D is duration of the call calculated as a result of step 502, and $k_d$ is a coefficient corresponding to duration of the call. E is the engagement score of the call calculated as a result of step 503, and $k_e$ is a coefficient corresponding to engagement score of the call. H is early/late hours score for the call calculated as a result of step 504, and $k_h$ is a coefficient corresponding to early/late hours score. M is after-work meeting arrangement score for the call calculated as a result of step 505, and $k_m$ is a coefficient corresponding to after-work meeting arrangement score. C is informal content score calculated as a result of step 506, and $k_c$ is a coefficient responding to informal content score. T is mobile phone score calculated as a result of step 507, and $k_t$ is a coefficient corresponding to mobile phone score.

Values of coefficients can be assigned either empirically or through various machine learning techniques.

Steps 501-507 can be performed in any order, both consequently and concurrently.

The score therefore represents a mixture of various behavioural metrics that evaluate such speakers' behaviour during the phone call that is correlated with closeness of the relationship or which presence prompts sufficient closeness of relationship as a prerequisite.

FIG. 6 illustrates a method for evaluating closeness of an email communication:

Step 601: humour score in an email is calculated as a number of occurrences of humorous phrases in an email. Humorous phrases are identified by matching phrases in the email with a humorous phrase text pattern. Humorous phrase pattern set can be produced either empirically or via guided machine learning techniques.

Humour is usually not expected in a formal correspondence and its usage hints at a relationship that is sufficiently close for it to be acceptable and common.

Step 602: emoticon score in an email is calculated as a number of occurrences of emoticons in the email. Emoticons are identified by matching phrases in the email with an emoticon pattern. Emoticon pattern set can be produced either empirically or via guided machine learning techniques.

Emoticons are rarely used in formal correspondence and their occurrence in the body of an email is a strong indicator of a close relationship between correspondents.

Step 603: spelling score in an email is calculated as a number of occurrences of spelling mistakes in the body of the email. Spelling mistakes are identified by matching words in the email against records in an electronic dictionary composed either empirically or via guided machine learning techniques. Failure to find such a match is interpreted as a spelling mistake.

Formal emails are usually checked for correct spelling to avoid potential reputational damage. Recurring spelling mistakes indicate sender's relaxed attitude towards how recipient would react and suggests that relationship between correspondents is close enough to permit this i.e. the recipient's perception of the sender is more personal and won't be affected by misspelling that could otherwise be perceived as either incompetence or a lack of respect. Misspelling could also be intentionally used to obfuscate the content of the conversation from conventional audit means such as keyword search, which implies a very close relationship.

Step 604: multilanguage score in an email is calculated as a number of occurrences of foreign language words in the email. Foreign language words are identified by matching words in the email against records in electronic dictionaries of foreign language words compiled either empirically or via guided machine learning techniques. Language is considered foreign as opposed to the native language of the sender, which is identified either as a pre-set constant value or as the language to which belongs the majority of words used in the email in question.

Using multiple languages in an email could imply both that the correspondence is informal (a formal email would be either in the language of the sender or of the recipient exclusively) and that the sender's knowledge of the recipient is sufficient to use their native language, thus hinting at a certain closeness of relationship.

Step 605: informal content score is calculated is a total number of informal phrases used in the email. Informal phrases are identified by matching a phrase in the email with an informal phrase pattern. Informal phrase pattern set can be produced either empirically, using an electronic slang dictionary or via guided machine learning techniques.

Using slang and explicit language is unusual and typically discouraged in formal communication, therefore emails containing such informal content imply sufficient closeness of relationship that allows such informality.

Step 606: attachment score for the email is calculated as 1 in case there is one or more image files attached to the email and 0 if no files are attached. Attached files are considered images if their extensions match the image file extension pattern set produced either empirically or via guided machine learning techniques.

Unlike sharing electronic spreadsheets and documents stored in text processor or portable document formats, images are much more likely to contain informal graphical content such as photos and sketches. Relationship between correspondents should be close enough for such behaviour to be appropriate, hence this factor should contribute to the closeness score of the email.

Step 607: external links score is calculated as 1 in case the there is one or more hyperlink in the body of the email leading to an entertainment web resource and 0 if no such links are contained in the email. The link is considered leading to an entertainment web resource if the web address it is pointing at is contained in an electronic database of such resources, which can be populated either empirically or via guided machine learning techniques.

If an email contains a link that leads to a website the content of which is considered to be primarily of entertainment nature, this suggests that the relationship between correspondents is close enough for such email to be considered appropriate. It also means that the sender either put some effort searching for content to humour the recipient or that when faced with such content the recipient was considered a person who would appreciate it—both cases imply a well-developed and close relationship between correspondents.

Step 608: email closeness score is calculated as $$S_{ei}(E_i) = k_h * H + k_m * M + k_p * P + k_l * L + k_c * C + k_a * A + k_x * X$$

where $S_{pi}(P_i)$ is the closeness score of email $E_i$, H is humour score calculated as a result of step 601, and $k_h$ is a coefficient corresponding to humour time. M is emoticon score calculated as a result of step 602, and $k_m$ is a coefficient corresponding to emoticon score. P is spelling score calculated as a result of step 603, and $k_p$ is a coefficient corresponding to spelling score of the call. L is multilanguage score calculated as a result of step 604, and $k_l$ is a coefficient corresponding to multilanguage score. C is informal content score calculated as a result of step 605, and $k_c$ is a coefficient corresponding to informal content score. A is attachment score calculated as a result of step 606, and $k_a$ is a coefficient responding to attachment score. X is external links score calculated as a result of step 607, and $k_x$ is a coefficient corresponding to external links score.

Values of coefficients can be assigned either empirically or through various machine learning techniques.

Steps 601-607 can be performed in any order, both consequently and concurrently.

The score therefore represents a mixture of various behavioural metrics that evaluate such sender's behaviour demonstrated while composing the email that is correlated with closeness of the relationship or which presence prompts sufficient closeness of relationship as a prerequisite.

FIG. 7 illustrates a method for evaluating closeness of an electronic messaging daily log:

Step 701: Messages in the log may be noted as belonging to the same conversation if difference in timestamp between each two consecutive messages is less than the threshold defined by the user, number of such conversation and message association with a particular conversation is noted.

Step 702: Engagement score is calculated as a total number of characters in the log sent by A divided by the total number of characters sent by B if the former is less than the letter and as a total number of characters sent by B divided by the total number of characters sent by A if otherwise.

Equal engagement of participants indicates a more substantial interest in receiving and providing information and a more developed relationship between individuals as opposed to a more one-sided conversation e.g. a sales pitch over the phone where a salesperson is dominating and a potential customer is mostly silent and comes back only with questions if interested at all in the offering.

Step 703: Duration is calculated as sum of lengths of time periods between the first and the last message for each conversation noted as a result of step 701.

Longer conversations may indicate that participants are interested and willing to dedicate significant time to exchange information therefore their relationship is closer than with those contacts the conversations with who are shorter.

Step 704: Action call score is calculated as a number of recommendations to act on the information contained in the daily log. Recommendations to act are identified by matching a phrase in the log with an action phrase pattern. Action phrase pattern set can be produced either empirically or via guided machine learning techniques.

A call to action such as a recommendation to execute or abstain from concluding a business transaction can usually be given when a person giving it is well aware of its context, implying that such information was either provided by the recipient of such advice or the person is aware of it due to a well-developed relationship with the recipient, both cases indicating a certain degree of closeness.

Step 705: early/late hours score for the log is calculated as total time length of conversations identified as a result of step 701 that took place after the close of business time plus time length of such conversations that took place before business opening time. Opening/Close of business time can be defined either as a constant e.g. 9 am to 5 p.m Monday to Friday or as a set of records in an electronic database specifying office hours for each person.

Instant messaging conversations outside of normal working hours mean that participants are either willing to stay late or come to the workplace early, thus indicating a well-developed and reasonably close relationship that justifies it.

Step 706: humour score in a daily log is calculated as a number of occurrences of humorous phrases in the daily log. Humorous phrases are identified by matching phrases in the daily log with a humorous phrase text pattern. Humorous phrase pattern set can be produced either empirically or via guided machine learning techniques.

Humour is common in instant messaging as it is generally a less formal communication channel, however an established relationship is a prerequisite to humorous content and the abundance of it in the conversation hints at a reasonably close relationship.

Step 707: emoticon score in a daily log is calculated as a number of occurrences of emoticons in it. Emoticons are identified by matching phrases in the email with an emoticon pattern. Emoticon pattern set can be produced either empirically or via guided machine learning techniques.

Emoticons are common in instant messaging as it is generally a less formal communication channel, however an established relationship is a prerequisite to using emoticons and the abundance of them in the conversation hints at a reasonably close relationship.

Step 708: spelling score for a daily log is calculated as a number of occurrences of spelling mistakes in it. Spelling mistakes may be identified by matching words in the email against records in an electronic dictionary composed either empirically or via guided machine learning techniques. Failure to find such a match is interpreted as a spelling mistake.

Spelling mistakes are common in instant messaging as it is generally a less formal communication channel, however recurring spelling mistakes indicate sender's relaxed attitude towards how recipient would react and suggests that relationship between correspondents is close enough to permit this i.e. the recipient's perception of the sender is more personal and won't be affected by misspelling that could otherwise be perceived as either incompetence or a lack of respect. Misspelling could also be intentionally used to obfuscate the content of the conversation from conventional audit means such as keyword search, which implies a very close relationship.

Step 709: informal content score is calculated is a total number of informal phrases used in the daily log. Informal phrases are identified by matching a phrase in the call with an informal phrase pattern. Informal phrase pattern set can be produced either empirically, using an electronic slang dictionary or via guided machine learning techniques.

Using slang and explicit language is not uncommon in instant messaging as it is generally a less formal communication channel, however the abundance of it is still uncommon and suggests that relationship between correspondents is close enough to permit this.

Step 710: multilanguage score in a daily log is calculated as a number of occurrences of foreign language words in it. Foreign language words are identified by matching words in the log against records in electronic dictionaries of foreign language words compiled either empirically or via guided machine learning techniques. Language is considered foreign as opposed to the native language, which is identified either as a pre-set constant value or as the language to which belongs the majority of words used in the daily log in question.

Using multiple languages in an email implies both that the sender's knowledge of the recipient is sufficient to use their native language, thus hinting at a certain closeness of relationship.

Step 711: external links score is calculated as 1 in case the there is one or more hyperlink in the daily log leading to an entertainment web resource and 0 if no such links are contained in it. The link is considered leading to an entertainment web resource if the web address it is pointing at is contained in an electronic database of such resources, which can be populated either empirically or via guided machine learning techniques.

If a daily log contains a link that leads to a website the content of which is considered to be primarily of entertainment nature, this suggests that the relationship between correspondents is close enough for such information to be considered appropriate. It also means that the sender either put some effort searching for content to humour the recipient or that when faced with such content the recipient was considered a person who would appreciate it—both cases imply a well-developed and close relationship between participants.

Step 712: switch score for a daily log is calculated as 1 in case the daily log contains an invitation to switch to another mode of communication and 0 the email contains no such invitations. Invitation to switch is identified by matching a phrase in the log with a switch invitation pattern. Switch invitation pattern set can be produced either empirically or via guided machine learning techniques.

Invitations to switch from messaging to phone or to meet in person imply a variety of possible factors that all hint at a developed relationship between participants. These include the fact that they already know each other, know each other's phone numbers, casually call or meet with each other-in each case suggesting that the relationship is reasonably close.

Step 713: electronic messaging log closeness score is calculated as $$S_{mi}(L_i) = k_p*P + k_d*D + k_a*A + k_e*E + k_h*H + k_m*M + k_g*G + k_c*C + k_u*U + k_x*X + k_w*W$$

where $S_{mi}(L_i)$ is the closeness score of daily log $L_i$, P is humour score calculated as a result of step 702, and $k_p$ is a coefficient corresponding to possession score. D is duration calculated as a result of step 703, and $k_d$ is a coefficient corresponding to duration. A is action call score calculated as a result of step 704, and $k_a$ is a coefficient corresponding to action call score of the call. E is early/late hours score calculated as a result of step 705, and $k_e$ is a coefficient corresponding to early/late hours score. H is humour score calculated as a result of step 706, and $k_h$ is a coefficient corresponding to humour score. M is emoticon score calculated as a result of step 707, and $k_m$ is a coefficient responding to emoticon score. G is spelling score calculated as a result of step 708, and $k_g$ is a coefficient corresponding to spelling score. C is informal content score calculated as a result of step 709, and $k_c$ is a coefficient corresponding to informal content score. U is multilanguage score calculated as a result of step 710, and $k_u$ is a coefficient corresponding to multilanguage score. X is external links score calculated as a result of step 711, and $k_x$ is a coefficient corresponding to external links score. W is switch score calculated as a result of step 712, and $k_w$ is a coefficient corresponding to switch score.

Values of coefficients can be assigned either empirically or through various machine learning techniques.

Steps 702-712 can be performed in any order, both consequently and concurrently.

The score therefore represents a mixture of various behavioural metrics that evaluate such participants' behaviour demonstrated while engaging in an electronic messaging conversations over the course of one day that is correlated with closeness of the relationship or which presence prompts sufficient closeness of relationship as a prerequisite.

Figure 8:
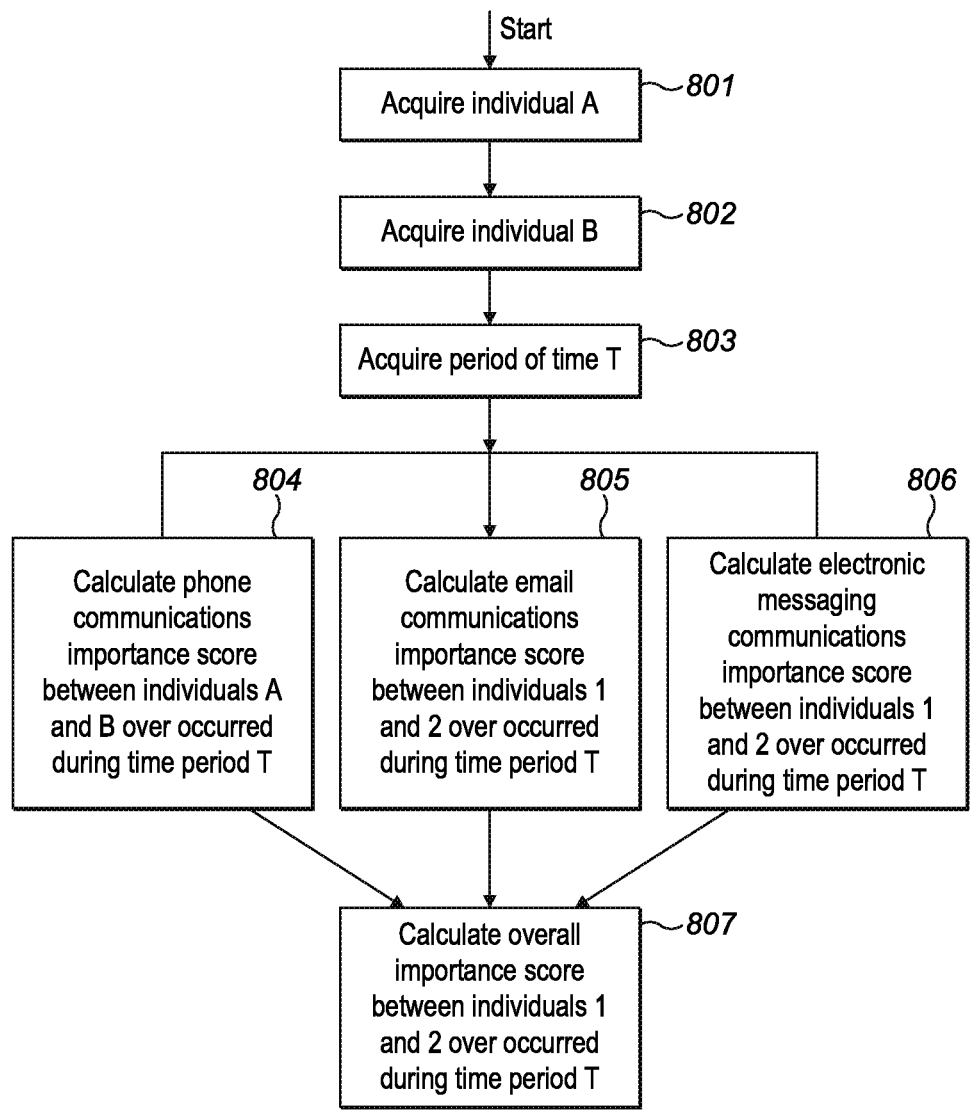
FIG. 8 is a flow chart illustrating the method for evaluating importance score for combined communications between individuals over a period of time.

FIG. 8 illustrates a proposed method of determining a measure of association between two correspondents. In this example embodiment, the measure of association is the level of importance of the relationship between the two individuals over a period of time. FIG. 8 identifies the following steps:

Step 801: individual A is defined by the user;
Step 802: individual B is defined by the user;
Step 803: period of time T is defined by the user;
Step 804: importance score for phone communications between individuals A and B over time period T is calculated according to the method presented on FIG. 9 through steps 901-903;
Step 805: importance score for email communications between individuals A and B over time period T is calculated according to the method presented on FIG. 10 through steps 1001-1007;
Step 806: importance score for electronic messaging communications between individuals A and B over time period T is calculated according to the method presented on FIG. 11 through steps 1101-1103;
Step 807: importance score for relationship between individuals A and B over time period T is calculated as:

$$IS(A,B,T) = k_p*S_p(A,B,T) + k_e*S_e(A,B,T) + k_m*S_m(A,B,T)$$

Here, IS(A,B,T) is the overall importance score for relationship between individuals A and B over time period T and takes into account the importance scores of various means of communication, such as phone $S_p$(A,B,T), email $S_e$(A,B,T), and electronic messaging $S_m$(A,B,T).

$S_p$(A,B,T) is the importance score for phone communications between individuals A and B over time period T calculated at step 104, $k_p$ is a coefficient corresponding to importance score for phone communications, $S_e$(A,B,T) is the importance score for email communications between individuals A and B over time period T calculated at step 105, $k_e$ is a coefficient corresponding to importance score for email communications, $S_m$(A,B,T) is the importance score for electronic messaging communications between individuals A and B over time period T calculated at step 106, $k_m$ is a coefficient corresponding to electronic messaging importance score for phone communications.

Values of coefficients can be assigned either empirically or through various machine learning techniques.

Steps 804-806 can be performed in any order, both consequently and concurrently.

The score therefore represents a mix of behavioural inputs from different communication channels weighted according to their significance e.g. phone calls can be deemed more significant in determining the overall relationship importance as they are usually preferred to emails when important information needs to be communicates quickly and the timely receipt guaranteed.

Figure 9:
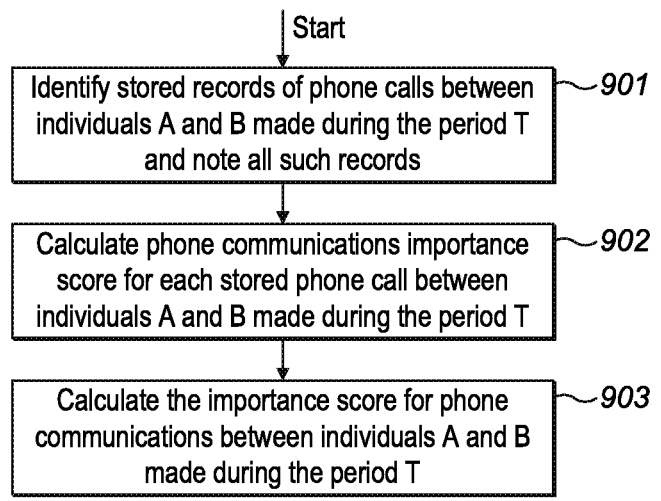
FIG. 9 is a flow chart illustrating the method for evaluating importance score for phone communications between individuals over a period of time.

FIG. 9 illustrates a method for evaluating importance of phone communications between individuals A and B over time period T:

Step 901: data storage (e.g. electronic database) is searched for records of phone calls placed within the time period T and in which either A is the dialler and B is the recipient of the call or vice versa and the results of the search, i.e. phone call records, are noted;

Step 902: importance score for each phone call record noted as a result of step 901 is calculated according to the method presented in FIG. 5 through steps 1201-1207;

Step 903: importance of phone communications between individuals A and B over time period T is calculated as:

$$S_p(A, B, T) = k_s * \sum_{i=1}^{n} S_{pi}(P_i)$$

where $S_p$(A,B,T) is importance of phone communications between individuals A and B over time period T, n is the number of phone call records $P_i$ noted as a result of step 901, $S_{pi}$(P) is the importance score for a phone call record $P_i$ calculated as a result of step 902, $k_s$ is a coefficient corresponding to the sum of importance scores for each noted phone call record.

Values of coefficients can be assigned either empirically or through various machine learning techniques.

The score therefore represents an average importance score of individual phone calls between two individuals.

Figure 10:
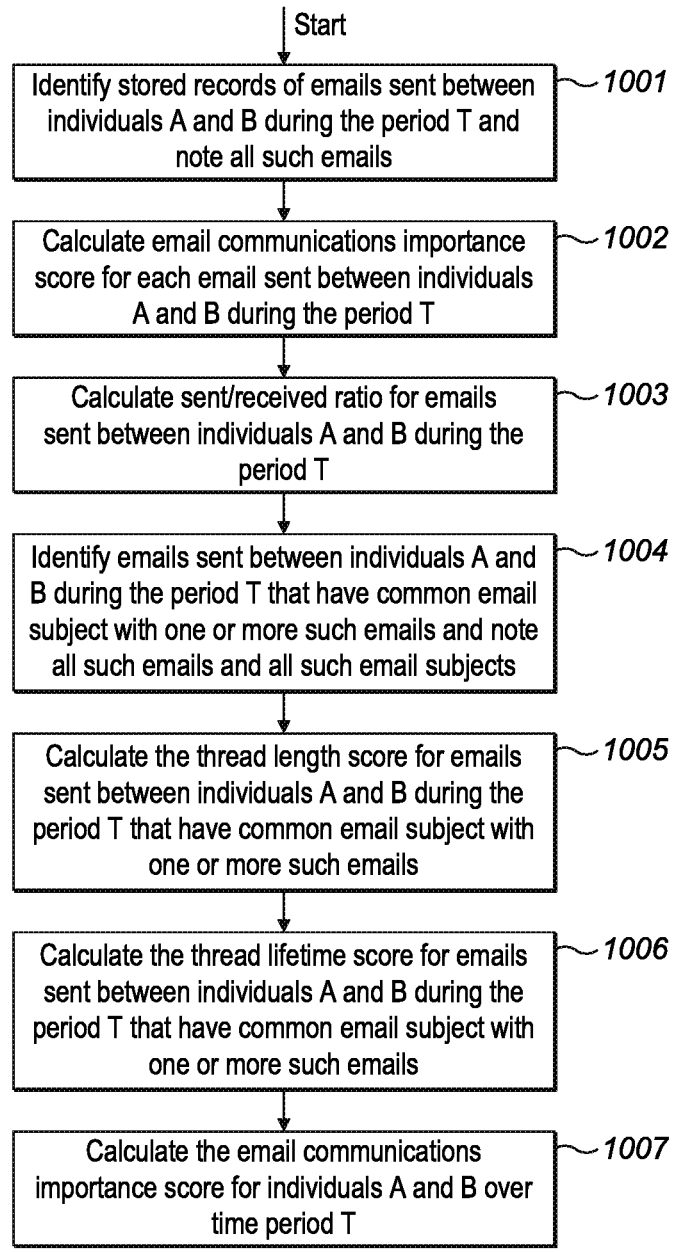
FIG. 10 is a flow chart illustrating the method for evaluating importance score for email communications between individuals over a period of time.
Figure 11:
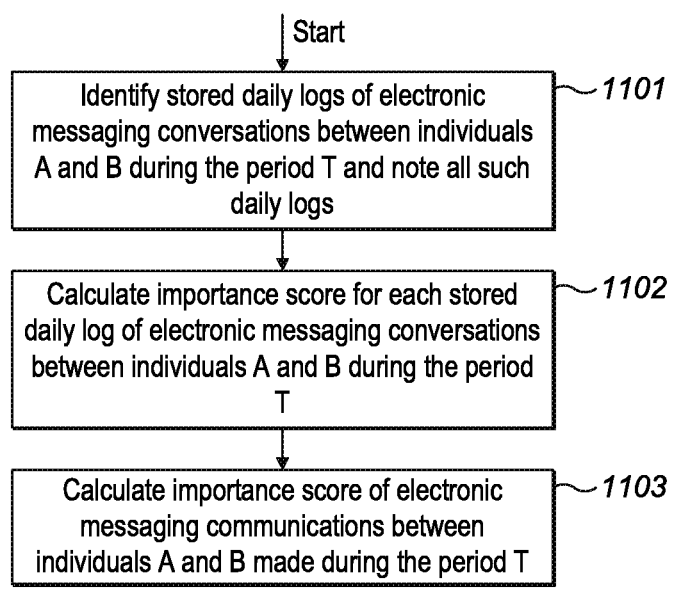
FIG. 11 is a flow chart illustrating the method for evaluating importance score for electronic messaging communications between individuals over a period of time.

FIG. 10 illustrates a method for evaluating importance of email communications between individuals A and B over time period T:

Step 1001: data storage (e.g. electronic database) is searched for emails originated within the time period T and in which either A is the sender and B is the recipient of the email or vice versa and the results of the search, i.e. emails, are noted.

Figure 13:
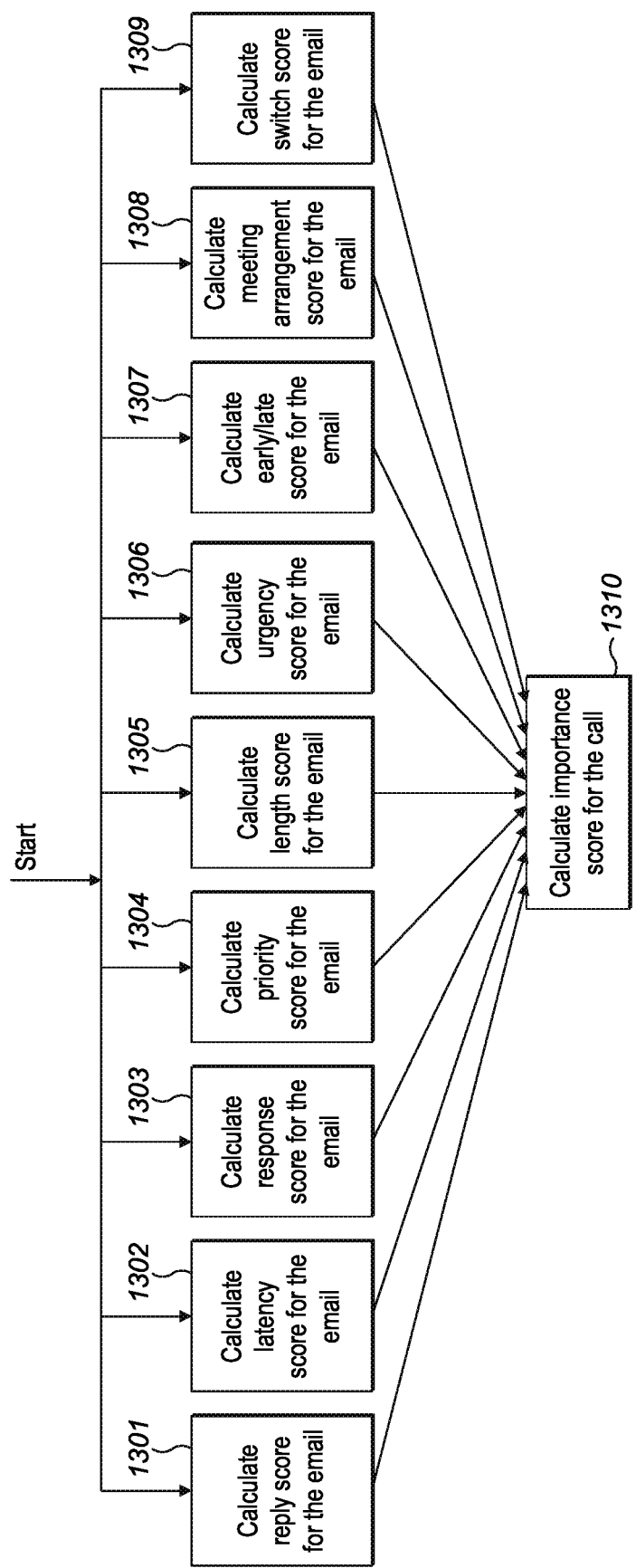
FIG. 13 is a flow chart illustrating the method for evaluating importance score for an email.

Step 1002: importance score for each email noted as a result of step 1001 is calculated according to the method presented in FIG. 13 through steps 1301-1310.

Step 1003: sent/received calls ratio is calculated as total number of emails noted as a result of step 1001 in which A was the sender divided by the total number of such emails in which A was the recipient if the former is fewer than the latter, otherwise as total number of emails noted as a result of step 301 in which B was the sender divided by the total number of such emails in which B was the recipient.

Communications where correspondents actively seek information by asking questions and providing additional information implies that such correspondence is of importance to their decision-making process.

Step 1004: emails noted as a result of step 1001 are searched for emails for which there is at least one other email from those noted as a result of step 1001 that has the same email subject or the subject contains one or more "re:" prefixes preceding the same email subject; emails matching the search criteria and their subjects are noted, each noted subject is assigned a successive integer number starting from 1.

Step 1005: thread length score is calculated as a total number of emails noted as a result of step 1004.

Revolving discussion implies a certain interest in the topics that are important enough for the correspondents to continue discussing it measured in the total number of interactions i.e. emails sent, suggesting that the issue is important to their decision-making.

Step 1006: thread lifetime score is calculated as:

$$H = k_e * \sum_{i=1}^{n}(T_{i,l} - T_{i,f})$$

where H is thread lifetime score, n is the total number of subjects noted as a result of step 1004, $T_{i,l}$ is time of origination of the email in a group of emails sharing the subject numbered as i as a result of step 1004 that has the latest time of origination among all emails in this group; $T_{i,f}$ is time of origination of the email in a group of emails sharing the subject numbered as i as a result of step 1004 that has the earliest time of origination among all emails in this group.

Topics that continue being discussed over a prolonged period of time indicate periodic or persistent issues that are important enough for correspondents to spend significant amount of time discussing them.

Step 1007: importance of email communications between individuals A and B over time period T is calculated as:

$$S_e(A, B, T) = k_e * \sum_{i=1}^{n} S_{ei}(E_i) + k_r * R(A, B, T) + k_l * L + k_h * H$$

where $S_e(A,B,T)$ is importance of email communications between individuals A and B over time period T, n is the number of emails $E_i$ noted as a result of step 1001, $S_{ei}(E_i)$ is the importance score for an email $E_i$ calculated as a result of step 1002, $k_e$ is a coefficient corresponding to the sum of importance scores for each noted email, $R(A,B,T)$ is the sent/received emails ratio calculated at step 1003, $k_r$ is a coefficient corresponding to the sent/received emails ratio. All coefficients have fixed values, L is the thread length score calculated at step 1005, $k_l$ is a coefficient corresponding thread length score, H is the thread lifetime score calculated at step 1006, $k_h$ is a coefficient corresponding to thread lifetime score.

Values of coefficients can be assigned either empirically or through various machine learning techniques.

The score therefore represents a mixture of average importance score of individual emails between two individuals and the quantitative and temporal features of reciprocating email conversations.

FIG. 1 illustrates a method for evaluating importance of electronic messaging communications between individuals A and B over time period T:

Step 1101: data storage (e.g. electronic database) is searched for daily logs conversations conducted via electronic messaging services (e.g. chat rooms) generated within the time period T and in which both A and B participated; the results of the search, i.e. daily logs, are noted.

Figure 14:
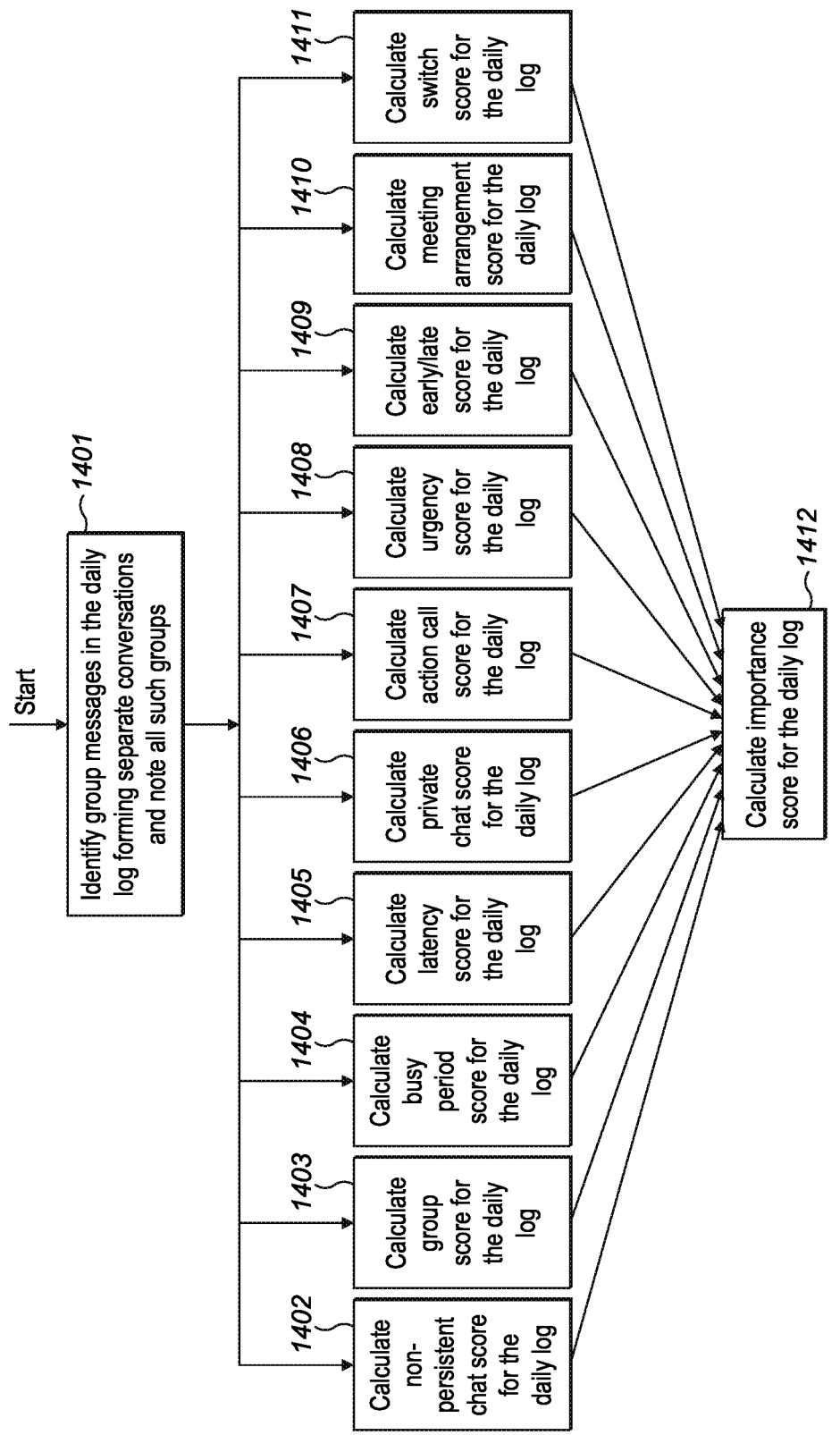
FIG. 14 is a flow chart illustrating the method for evaluating importance score for a daily log of conversations conducted via electronic messaging services such as chat rooms.

Step 1102: importance score for each daily log noted as a result of step 1101 is calculated according to the method presented in FIG. 14 through steps 1401-1412.

Step 1103: importance of electronic messaging communications between individuals A and B over time period T is calculated as:

$$S_m(A, B, T) = k_m * \sum_{i=1}^{n} S_{mi}(L_i)$$

where $S_e(A,B,T)$ is importance of electronic messaging communications between individuals A and B over time period T, n is the number of daily logs $L_i$ noted as a result of step 1101, $S_{mi}(L_i)$ is the importance score for a daily log $L_i$ as a result of step 1102, $k_m$ is a coefficient corresponding to the sum of importance scores for noted daily log.

Values of coefficients can be assigned either empirically or through various machine learning techniques.

The score therefore represents an average importance score of individual daily logs of instant messaging conversations between two individuals.

Figure 12:
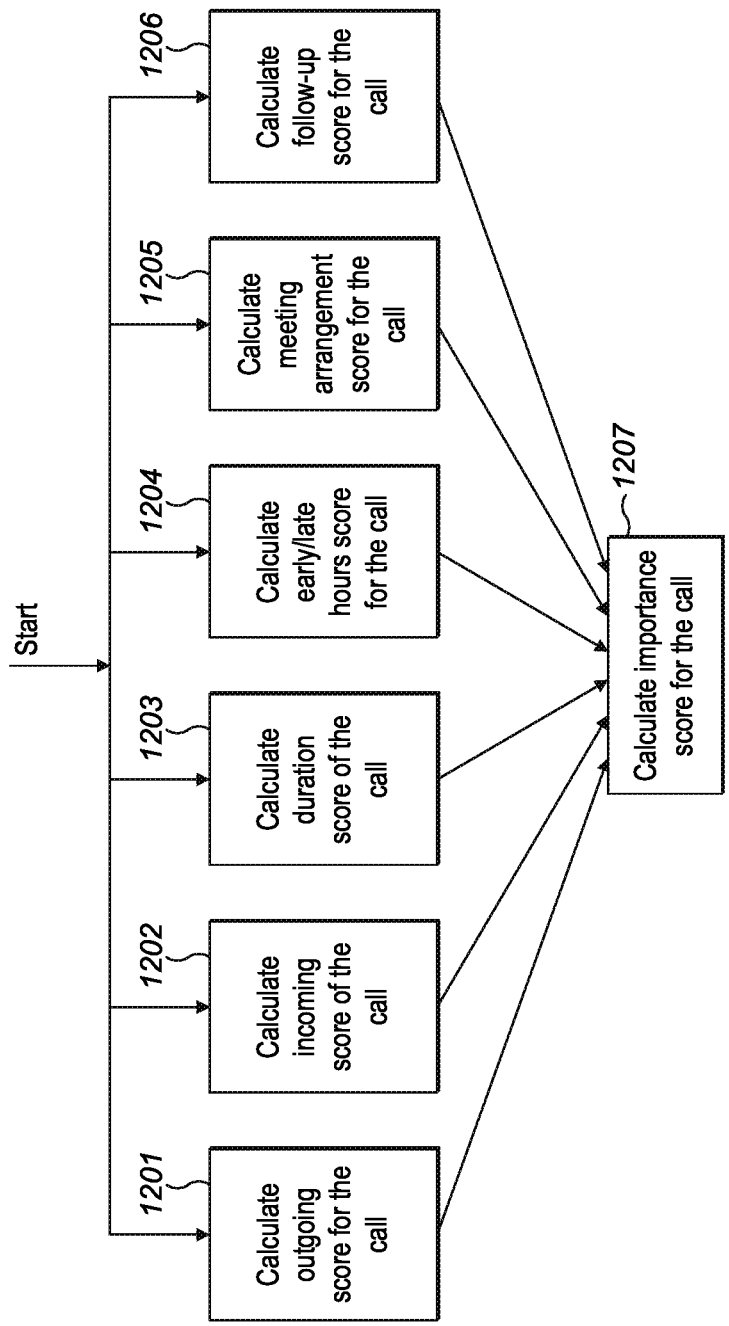
FIG. 12 is a flow chart illustrating the method for evaluating importance score for a phone call record.

FIG. 12 illustrates a method for evaluating importance of a phone call record:

Step 1201: outgoing score for the call is calculated as 1 if the time when the call was started falls into a busy period. Busy periods are periods of time when the number of incoming communication is significantly higher than normal and can be identified either as a quantitative threshold (e.g. when the total amount of incoming calls, messages and emails per hour is more than a specific value) or deducted by applying methods of statistical analysis and guided machine learning techniques.

Calls made during busy periods indicate a certain degree of importance. In a busy period time becomes a limited resource and outgoing calls are usually prioritised on the basis of their importance. Busy periods also indicate a potential business issue which means that time is of the essence and calls are made to those persons who would be most valuable to the caller in regards to solving such issue.

Step 1202: incoming score for the call is calculated as 1 if the time when the call was started falls into a busy period. Busy periods are periods of time when the number of incoming communication is significantly higher than normal and can be identified either as a quantitative threshold (e.g. when the total amount of incoming calls, messages and emails per hour is more than a specific value) or deducted by applying methods of statistical analysis and guided machine learning techniques.

Calls received during busy periods indicate a certain degree of importance. In a busy period time becomes a limited resource and non-important incoming calls can be rejected (e.g. by being redirecting to another person or voicemail). Busy periods also indicate a potential business issue which means that time is of the essence and if the call was received during such time it is likely that the information exchanged was valuable to the caller in regards to solving such issue.

Step 1203: duration of the call is calculated as total time passed from the start till the end of the call if the time when the call was started in a busy period. Busy periods are periods of time when the number of incoming communication is significantly higher than normal and can be identified either as a quantitative threshold (e.g. when the total amount of incoming calls, messages and emails per hour is more than a specific value) or deducted by applying methods of statistical analysis and guided machine learning techniques.

Long phone calls during busy periods indicate a certain degree of importance. In a busy period time becomes a limited resource and call length is usually kept to minimum to save time, long phone calls during such period indicate a superior value of information exchanged. Busy periods also indicate a potential business issue which means that time is of the essence and a long call during such time is likely to be relevant to solving such issue and therefore valuable.

Step 1204: early/late hours score for the call is calculated as total time length of the call that took place after the close of business time plus time length of the call that took place before business opening time. Opening/Close of business time can be defined either as a constant e.g. 9 am to 5 p.m Monday to Friday or as a set of records in an electronic database specifying office hours for each person.

Calls placed outside of normal working hours indicate an increased degree of importance due to a certain valuable information that prompted the call to be placed without delay or before opening of business on the next day.

Step 1205: meeting arrangement score for the call is calculated as 1 in case the phone call contains an invitation by one of the speakers to another to meet in person and 0 the record contains no such invitations. Invitation to meet is identified by matching a phrase in the call with an invitation pattern either through speech to text mechanisms or via direct voice pattern matching. Invitation pattern set can be produced either empirically or via guided machine learning techniques.

Meetings arrangements during the call indicate either a present (e.g. information being exchanged over the phone and a follow-up meeting is arranged to discuss further or conclude a contract) or future (e.g. information is considered too sensitive to be exchanged over the phone and a meeting therefore is arranged) exchange of valuable information.

Step 1206: data storage (e.g. electronic database) is searched for emails and daily logs of electronic messaging between the participants of the call that contain an invitation to follow-up via phone and that were originated within the time period x immediately preceding the time at which the call started, if any email of daily log was found matching the search criteria the follow-up score is calculated as 1, otherwise as 0. Invitation to follow-up via phone is identified by matching a phrase in the email or the daily log with an invitation/follow-up phrase pattern. Invitation/follow-up pattern set can be produced either empirically or via guided machine learning techniques. Time period x can be defined either empirically or or deducted by applying methods of statistical analysis and guided machine learning techniques.

Phone calls that are themselves a follow-up conversation following an exchange of emails or instant messages bear a certain degree of importance as the information exchanged over the course of the call was deemed by the participants too sensitive to be provided otherwise.

Step 1207: phone call record importance score is calculated as $$S_{pi}=k_i*I+k_o*O+k_d*D+k_h*H+k_m*M+k_f*F+k_t*T$$

where $S_{pi}$ is the importance score of phone call, I is incoming score calculated as a result of step 1201, $k_i$ is a coefficient corresponding to incoming score, O is outgoing score calculated as a result of step 1202, $k_o$ is a coefficient corresponding to outgoing score, D is duration of score calculated as a result of step 1203, $k_l$ is a coefficient corresponding to duration score, H is early/late hours score for the call calculated as a result of step 1204, $k_h$ is a coefficient corresponding to early/late hours score, M is meeting arrangement score for the call calculated as a result of step 1205, $k_m$ is a coefficient corresponding to meeting arrangement score, F is follow-up score calculated as a result of step 1206, $k_f$ is a coefficient responding to follow-up score.

Values of coefficients can be assigned either empirically or through various machine learning techniques.

Steps 1201-1206 can be performed in any order, both consequently and concurrently.

The score therefore represents a mixture of various behavioural metrics that evaluate such speakers' behaviour during the phone call that is correlated with value of information and the importance of the relationship between participants.

FIG. 13 illustrates a method for evaluating importance of an email:

Step 1301: reply score in an email is calculated as 1 if the email is itself a reply to another email and 0 if not. The email sent in reply to another email can be identified either through an empirically derived set of rules (e.g. if email's subject field contains prefix "re:" the email is considered a reply) or by applying algorithms that aim to reconstruct the chronology of email correspondence by comparing and matching email address, time sent, and email content.

An email in reply to another email can be sent for a variety of reason ranging from acknowledging receipt to requesting additional information. All such reasons however suggest that the information contained in the original email was valuable enough to trigger a reply. therefore the reply also contains a certain degree of importance.

Step 1302: data storage (e.g. electronic database) is searched for emails sent by the recipient of this email to the sender of this email that share a common email subject and that were sent within the time period x immediately preceding the time at which the email was originated, if one or more emails were found matching the search criteria, the one with the latest time of origination is noted and the latency score is calculated as $$L = \frac{k}{T - T_N}$$

where L is latency score, k is coefficient that can be assigned either empirically or through various machine learning techniques; $T-T_N$ is difference in time of origination between this email and the noted email; otherwise the latency score is calculated as 0. The common email subject can be identified either through an empirically derived set of rules (e.g. if email's subject field contains a phrase with any number of "re:" and "fwd:" prefixes) or by applying algorithms that aim to reconstruct the chronology of email correspondence by comparing and matching email address, time when sent and the email content.

A short period of time between receiving an email and sending a response reflects the urgency of such information exchange and prioritisation over other activity. Both these factors hint at the importance of information contained in such emails.

Step 1303: response score for the email is calculated as 1 if the time when the email was sent falls into a busy period. Busy periods are periods of time when the number of incoming communication is significantly higher than normal and can be identified either as a quantitative threshold (e.g. when the total amount of incoming calls, messages and emails per hour is more than a specific value) or deducted by applying methods of statistical analysis and guided machine learning techniques.

Emails sent during busy periods indicate a certain degree of importance. In a busy period time becomes a limited resource and outgoing emails are usually prioritised on the basis of their importance. Busy periods also indicate a potential business issue which means that time is of the essence and emails are sent to those persons who would be most valuable to the sender in regards to solving such issue.

Step 1304: priority score is calculated as 1 if this email (R1) is a reply to another email L1 and within the time period x immediately following the time this email another email R2 was sent by the same sender as R1 which was a reply to an email O2 and the time of origination of O1 is later than the time of origination of O2. The email sent in reply to another email can be identified either through an empirically derived set of rules (e.g. if email's subject field contains prefix "re:" followed by a text in the subject field that matches the subject field of another email) or by applying algorithms that aim to reconstruct the chronology of email correspondence by comparing and matching email address, time sent, and email content. Time period x can be defined either empirically or or deducted by applying methods of statistical analysis and guided machine learning techniques.

Prioritising replies in non-chronological order implies higher importance of those emails that were sent first.

Step 1305: length score is calculated is a total number of characters comprising the body of this email excluding the text containing the past correspondence and attached to the body of the email.

The amount of information contained in the email reflects the time and effort put into producing it and therefore prompts a certain degree of importance Longer emails are also more likely to contain more important and valuable information than shorter ones.

Step 1306: urgency score is calculated as the number of occurrences of words and phrases in the body of the email implying urgency of the message. Phrases implying urgency are identified by matching a phrase in the email with an urgent phrase pattern. Urgent phrase pattern set can be produced either empirically, using an electronic dictionary or via guided machine learning techniques.

Emails containing words and phrases implying urgency usually contain information that needs acting upon without delay e.g. an opportunity that shouldn't be lost or a threat that needs to be prevented from crystallising, in both cases implying a high degree of importance.

Step 1307: early/late hours score for the email is calculated as 1 if the email after the close of business time or before business opening time. Opening/Close of business time can be defined either as a constant e.g. 9 am to 5 p.m Monday to Friday or as a set of records in an electronic database specifying office hours for each person.

Emails sent outside of normal working hours indicate an increased degree of importance due to a certain valuable information that prompted the email to be sent without delay. It also could be that that the email was sent during the course of extra hours of work due to an urgency which also suggests an increased degree of importance.

Step 1308: meeting arrangement score for the email is calculated as 1 in case the email contains an invitation by the sender to meet in person and 0 the record contains no such invitations. Invitation to meet is identified by matching a phrase in the email with an invitation pattern. Invitation pattern set can be produced either empirically or via guided machine learning techniques.

Meetings arrangements in an email indicate either a present (e.g. information being exchanged over the email correspondence and a follow-up meeting is arranged to discuss further or conclude a contract) or future (e.g. information is considered too sensitive to be exchanged via email and a meeting therefore is arranged) exchange of valuable information.

Step 1309: switch score for the email is calculated as 1 in case the email contains an invitation to switch to another mode of communication and 0 the email contains no such invitations. Invitation to switch is identified by matching a phrase in the email with a switch invitation pattern. Switch invitation pattern set can be produced either empirically or via guided machine learning techniques.

Switching to a more private (e.g. phone) or interactive (e.g. instant messaging) communication channel of communications signalises an increase in importance of information being or to be exchanged that prompts such a change.

Step 1310: email importance score is calculated as $$S = k_r*R + k_l*L + k_t*T + k_p*P + k_d*D + k_u*U + k_e*E + k_m*M + k_w*W$$

where $S_{et}(E_t)$ is the importance score of the email, R is reply score calculated as a result of step 1301, $k_h$ is a coefficient corresponding to reply score, L is latence score calculated as a result of step 1302, $k_l$ is a coefficient corresponding to latence score, T is response score calculated as a result of step 1303, $k_r$ is a coefficient corresponding to response score, P is priority score calculated as a result of step 1304, $k_l$ is a coefficient corresponding to priority score, D is length score calculated as a result of step 1305, $k_d$ is a coefficient corresponding to length score, U is urgency score calculated as a result of step 1306, $k_u$ is a coefficient responding to urgency score, E is early/late hours score calculated as a result of step 1307, $k_e$ is a coefficient corresponding to early/late hours score, M is meeting arrangement score calculated as a result of step 1308, $k_m$ is a coefficient corresponding to meeting arrangement score, W is switch score calculated as a result of step 1309, $k_w$ is a coefficient corresponding to switch score.

Values of coefficients can be assigned either empirically or through various machine learning techniques.

Steps 1301-1309 can be performed in any order, both consequently and concurrently.

The score therefore represents a mixture of various behavioural metrics that evaluate such sender's behaviour demonstrated while composing the email that is correlated with value of information and the importance of the relationship between participants.

FIG. 14 illustrates a method for evaluating importance of an electronic messaging daily log.

Step 1401: Messages in the log are noted as belonging to the same conversation if difference in time between each two consecutive messages is less than the threshold defined either empirically or through various machine learning techniques, each such conversation and associations of messages with a particular conversation are noted;

Step 1402: non-persistent chat score is calculated as 1 the logged content is attributed to a conversation in a non-persistent electronic chat room and 0 if not. Non-persistent chat room attribution can be checked either by analysing the records in the daily log indicating the creation of non-persistent chat or through the analysis of metadata contained the electronic file containing the daily log.

Creation of a private, non-persistent chat between individuals suggests that the need to use a more private communication channel than a persistent group chat open for everyone and indicates a certain degree of importance of information being exchanged.

Step 1403: group score is calculated as:

$$G = \frac{1}{U},$$

where U is the total number of participants whose messages constitute the daily log.

Information made available to a large group of people is likely to contain less valuable information than information shared with a small circle of people as wide dissemination is more likely to diminish a competitive advantage created by exclusive knowledge of it.

Step 1404: busy period score is calculated as 1 if one or more conversations noted as a result of step 1401 started and ended falls into a busy period. Busy periods are periods of time when the number of incoming communication is significantly higher than normal and can be identified either as a quantitative threshold (e.g. when the total amount of incoming calls, messages and emails per hour is more than a specific value) or deducted by applying methods of statistical analysis and guided machine learning techniques.

Instant messages sent during busy periods indicate a certain degree of importance. In a busy period time becomes a limited resource and communications are usually prioritised on the basis of their importance. Busy periods also indicate a potential business issue which means that time is of the essence and messages are more likely to be exchanges with those persons who would be most valuable to the sender in regards to solving such issue.

Step 1405: latency score is calculated as a sum of latency scores for each conversation. Latency score for a conversation score can be calculated if the conversation contains 2 or more messages as $$L = \frac{N}{T_L - T_F}$$

where L is latency score, N is the total number of messages comprising the conversation; $T_L - T_F$ is difference in time between the first and the last message of the conversation; otherwise the latency score is calculated as 0.

Low latency indicates measures the volume of messages exchanged relative to the duration of such exchange with high score indicating a rapid exchange of information and hinting at the urgency of it as well as prioritisation over other activity. Both these factors suggest a certain degree of importance of information contained in such conversations.

Step 1406: the private chat score is calculated as 1 if the daily log contains a conversation between two persons or more that were at the same time participating altogether in a group chat and 0 if not.

Initiating a separate conversation with persons who were previously liaised with via an open messaging channel indicates a need to keep confidential particular part of information that is exchanged through the private chat while continuing a conversation via an open chat discussion. Such confidentiality indicates a particular importance of such information as opposed to the rest of it that was exchanged via an open channel.

Step 1407: Action call score is calculated as a number of recommendations to act on the information contained in the daily log. Recommendations to act are identified by matching a phrase in the log with an action phrase pattern. Action phrase pattern set can be produced either empirically or via guided machine learning techniques.

A call to action such as a recommendation to execute or abstain from concluding a business transaction tends to be based on the context in which it was given. Such context in turn is likely to contain factual and analytical information that forms a basis of suggested decision-making, hence indicating high value and therefore importance of such information.

Step 1408: urgency score is calculated as the number of occurrences of words and phrases in the daily log implying urgency messages. Phrases implying urgency are identified by matching a phrase in the daily log with an urgent phrase pattern. Urgent phrase pattern set can be produced either empirically, using an electronic dictionary or via guided machine learning techniques.

Daily logs containing words and phrases implying urgency tend to contain information that needs acting upon without delay e.g. an opportunity that shouldn't be lost or a threat that needs to be prevented from crystallising, in both cases implying a high degree of importance.

Step 1409: early/late hours score for a daily log is calculated as 1 if the log contains individual conversations started after the close of business time or before business opening time. Opening/Close of business time can be defined either as a constant e.g. 9 am to 5 p.m Monday to Friday or as a set of records in an electronic database specifying office hours for each person.

Conversations outside of normal working hours indicate an increased degree of importance due to a certain valuable information that prompted the message to be sent without delay. It also could be that that such messages were sent during the course of extra hours of work on an urgent task which also suggests an increased degree of importance.

Step 1410: meeting arrangement score for a daily log calculated as 1 in case the log contains an invitation by a participant to meet in person and 0 the record contains no such invitations. Invitation to meet is identified by matching a phrase in the log with an invitation pattern. Invitation pattern set can be produced either empirically or via guided machine learning techniques.

Meetings arrangements in the daily log indicate either a present (e.g. information being exchanged via instant messaging and a follow-up meeting is arranged to discuss further or conclude a contract) or future (e.g. information is considered too sensitive to be exchanged via instant messaging and a meeting therefore is arranged) exchange of valuable information.

Step 1411: switch score for a daily log is calculated as 1 in case the daily log contains an invitation to switch to another mode of communication and 0 the email contains no such invitations. Invitation to switch is identified by matching a phrase in the log with a switch invitation pattern. Switch invitation pattern set can be produced either empirically or via guided machine learning techniques.

Switching to a more private (e.g. phone) or versatile (e.g. sending files via email) communication channel of communications signalises an increase in importance of information being or to be exchanged that prompts such a change.

Step 1412: electronic messaging log importance score is calculated as
$$S=k_n*N+k_g*G+k_b*B+k_p*P+k_l*L+k_a*A+k_u*U+k_e*E+k_m*M+k_w*W$$
where S is the importance score of daily log $L_i$, N is non-persistent chat score calculated as a result of step 1402, $k_n$ is a coefficient corresponding to non-persistent chat score, G is group score calculated as a result of step 1403, $k_d$ is a coefficient corresponding to group score, B is busy period score calculated as a result of step 1404, $k_b$ is a coefficient corresponding to busy period score, P is private chat score calculated as a result of step 1405, $k_p$ is a coefficient corresponding to private chat score, L is latency score calculated as a result of step 1406, $k_l$ is a coefficient corresponding to latency score, A is action call score calculated as a result of step 1407, $k_a$ is a coefficient responding to action call score, U is urgency score calculated as a result of step 1408, $k_u$ is a coefficient corresponding to urgency score, E is early/late hours score calculated as a result of step 1409, $k_e$ is a coefficient corresponding to early/late hours score, M is meeting arrangement score calculated as a result of step 1410, $k_m$ is a coefficient corresponding to meeting arrangement score, W is switch score calculated as a result of step 1411, $k_w$ is a coefficient corresponding to switch score.

Values of coefficients can be assigned either empirically or through various machine learning techniques.

Steps 1402-1411 can be performed in any order, both consequently and concurrently.

The score therefore represents a mixture of various behavioural metrics that evaluate such participants' behaviour demonstrated in instant messaging conversations that is correlated with the value of information and the importance of the relationship between participants.

FIG. 15 is an illustration of an example user interface for visualising communications of a designated person as rendered on a computer screen.

Contacts map visualisation 1501 illustrates and is based upon the closeness and importance of relationship between a designated person and those with whom records of communications are stored on a digital computer, as well as the total volume (i.e. the number) of such records. A person selected by the user is visualised in the centre of the contact map 1501 as a black circle.

The selected person's name is visualised in white font in a black oval label above. Each of selected person's contacts with whom the data storage of an electronic computer contains one or more records of communication with the selected person is visualised on the contacts map 1501 around the selected user pursuant to the closeness and importance of relationship and the total volume of correspondence between them.

Such contacts are visualised as a circle the radius of which is proportional to the total volume of correspondence and is either capped at a constant value or calculated as the total volume of correspondence divided by a constant value.

The distance between the centre of the circle and the centre of the circle visualising the selected person is proportional to the closeness score of the relationship between the contact and the selected person and is either capped at a constant value or calculated as closeness score divided by a constant value.

The colour of the circle ranges from a light colour to a dark colour proportionally to the importance score of the relationship between the contact and the selected person. The contact name is visualised in black font in a white label above.

The position of each such circle and label visualising the contacts of the selected person on the contacts map 1501, apart from the logic described above, can be random as long as the such visualisation does not result in any circles or labels interfering with each other. Constants for visualising volume and closeness can be either pre-set or derived from the maximum values of volume and closeness score among contacts to be visualised. Clicking on any of the contacts visualised in 1501 causes relationship details screen to be visualised as shown on FIG. 16.

The user interface may contain a data type selector 1502 that allows the visualisation to be refined by selecting one or more types of data, i.e. emails, phone calls, instant messaging logs to be taken into account when visualising the contacts of a selected person on the contacts map 1501. The selector allows the user to specify data types by selecting and deselecting checkboxes labelled with corresponding data types. By default all data types are selected. Deselecting a data type results in the contacts map 1501 being redrawn with communications data of the corresponding excluded data type being ignored when determining the existence of contacts for a selected user with whom electronic records of correspondence can be found in the electronic storage of a digital computer; when calculating closeness and importance score for each identified contact the corresponding components of closeness and importance scores for the excluded data type are calculated as zero at steps 107 and 807 respectively.

The user interface may contain a timeframe selector 1503 that allows the visualisation to be refined by selecting the time period so that only records of communications originated during such period are taken into account when visualising the contacts of a selected person on the contacts map 1501. The selector allows the user to specify the starting and ending date of the period by either selecting the dates manually or as a period (e.g. 3 months, 6 months etc.) of time ending on the current date. By default the time period covers the whole history of records. Adjusting the time period results in the contacts map 1501 being redrawn with communications data outside of the selected time period being ignored when determining the existence of contacts for a selected user with whom electronic records of correspondence can be found in the electronic storage of a digital computer; when calculating closeness and importance score for each identified contact the observation period at steps 103 and 803 respectively is selected according to the setting of the timeframe selector 1503.

The user interface may contain a relationship selector 1504 that allows the visualisation to be refined by selecting the contacts of a selected person to be visualised on the contacts map 1501. The selector contains the full list of contacts for which records of any correspondence with the selected person could be found in the electronic data storage on a digital computer, along with corresponding closeness and importance scores and the total volume of correspondence. It may allow the user to specify such a contact by selecting and deselecting checkboxes positioned next to the corresponding list entries. By default all such contacts are selected. De-selecting a contact results in the contacts map 1501 being redrawn with deselected contact completely excluded from visualisation on it.

The user interface may contain a relevance selector 1505 that allows the visualisation to be refined by selecting named entities so that only records of communications containing such named entities are taken into account when visualising the contacts of a selected person on the contacts map 1501. The selector contains a list of named entities that is either pre-defined or generated as a result of analysis of records of correspondence (i.e. emails, instant messaging logs and phone call records either through speech to text mechanisms or via direct voice pattern matching) using natural language processing techniques for identifying named entities and allows the user to specify such named entities by selecting and deselecting checkboxes positioned next to the corresponding list entries. By default the contacts map 1501 is rendered irrespective of named entities contained in the correspondence. Selecting a named entity results in the contacts map 1501 being redrawn with communications that doesn't contain the selected named entities being ignored when determining the existence of contacts for a selected user with whom electronic records of correspondence can be found in the electronic storage of a digital computer; when calculating closeness and importance score for each identified contact only records containing the selected named entities are taken into account.

The user interface may contain an importance threshold selector 1506 that allows the visualisation to be refined by selecting the threshold value for the importance score so that only contacts of a selected person for whom the importance score is higher or equal to the threshold value are visualised on the contacts map 1501. The selector can take a form of a linear scale with a movable slider element determining the threshold value. By default the slider is set to a leftmost position that corresponds to a lowest value of importance score that can be potentially calculated effectively causing all contacts that meet the criteria of selectors 1502-1505 to be visualised on the contacts map 1501. The slider can then be moved left and right with the rightmost position corresponding to the highest value of importance score that can be potentially calculated and resulting in the contacts map 1501 being redrawn with only contacts for which importance score, given the criteria of selectors 1502-1505, is higher or equal to the threshold value selected on the slider to be visualised on the contacts map 1501.

The user interface may contain a closeness threshold selector 1507 that allows the visualisation to be refined by selecting the threshold value for the closeness score so that only contacts of a selected person for whom the closeness score is higher or equal to the threshold value are visualised on the contacts map 1501. The selector can take a form of a linear scale with a movable slider element determining the threshold value. By default the slider is set to a leftmost position that corresponds to a lowest value of closeness score that can be potentially calculated effectively causing all contacts that meet the criteria of selectors 1502-1505 to be visualised on the contacts map 1501. The slider can then be moved left and right with the rightmost position corresponding to the highest value of closeness score that can be potentially calculated and resulting in the contacts map 1501 being redrawn with only contacts for which closeness score, given the criteria of selectors 1502-1505, is higher or equal to the threshold value selected on the slider to be visualised on the contacts map 1501.

The user interface may contains a volume threshold selector 1508 that allows the visualisation to be refined by selecting the threshold value for the total volume of correspondence so that only contacts of a selected person for whom the total volume of correspondence is higher or equal to the threshold value are visualised on the contacts map 1501. The selector can take a form of a linear scale with a movable slider element determining the threshold value. By default the slider is set to a leftmost position that corresponds to a lowest value of total volume of correspondence that can be potentially calculated effectively causing all contacts that meet the criteria of selectors 1502-1505 to be visualised on the contacts map 1501. The slider can then be moved left and right with the rightmost position corresponding to the highest value of total volume of communications that can be potentially calculated and resulting in the contacts map 1501 being redrawn with only contacts for which the total volume of correspondence, given the criteria of selectors 1502-1505, is higher or equal to the threshold value selected on the slider to be visualised on the contacts map 1501.

FIG. 16 is an illustration of the relationship details screen of the user interface visualising the details of a relationship between two persons as rendered on a computer screen. Relationship illustrates and is based upon the closeness and importance of relationship between two persons on the basis of communications between them that are stored on a digital computer, as well as the total volume (i.e. the number) of such records and changes in such parameters over time.

Relationship details screen contains an importance score visualisation 1601 that demonstrates the changes in importance score of communications between two persons in the form of a time series 1602 and the current value of importance score in the form of a hollow pie chart 1603. The values of importance score mapped on the time series chart 1602 with a constant time step-interval in respect to the time axis 1604 and the corresponding score values mapped on the value axis 1605 are calculated for a set time period of time (e.g. one month, one fortnight etc.) preceding the corresponding date on the time axis 1604. The current importance score is equal to the value of importance score calculated and mapped on the time series 1602 for the latest (rightmost) period on the time series 1604 and is visualised on hollow pie chart 1603 as a proportion of the highest value of importance score that can be potentially calculated with a label in the centre of the pie chart indicating its value as a percentage.

Relationship details screen contains an closeness score visualisation 1606 that demonstrates the changes in closeness score of communications between two persons in the form of a time series 1607 and the current value of closeness score in the form of a hollow pie chart 1608. The values of closeness score mapped on the time series chart 1607 with a constant time step-interval in respect to the time axis 1609 and the corresponding score values mapped on the value axis 1610 are calculated for a set time period of time (e.g. one month, one fortnight etc.) preceding the corresponding date on the time axis 1609. The current closeness score is equal to the value of closeness score calculated and mapped on the time series 1607 for the latest (rightmost) period on the time series 1609 and is visualised on hollow pie chart 1608 as a proportion of the highest value of closeness score that can be potentially calculated with a label in the centre of the pie chart indicating its value as a percentage.

Relationship details screen contains a visualisation of the volume of correspondence 1611 that demonstrates the changes in the volume of correspondence between two persons in the form of a time series 1612 and the current value of the volume of correspondence in the form of a hollow pie chart 1613. The values of the volume of correspondence mapped on the time series chart 1612 with a constant time step-interval in respect to the time axis 1614 and the corresponding values mapped on the value axis 1615 are calculated for a set time period of time (e.g. one month, one fortnight etc.) preceding the corresponding date on the time axis 1614. The current volume of correspondence is equal to the value of the volume of correspondence calculated and mapped on the time series 1612 for the latest (rightmost) period on the time series 1614 and is visualised on hollow pie chart 1613 as a proportion of the highest value of the volume of correspondence that can be potentially calculated with a label in the centre of the pie chart indicating its value as a percentage.

Relationship details screen contains a visualisation of the most common named entities in the form of a word cloud 1616. Word cloud 1616 includes named entities that can are found in the correspondence between the selected persons as a result of analysis of such records (i.e. emails, instant messaging logs and phone call records either through speech to text mechanisms or via direct voice pattern matching) using natural language processing techniques for identifying named entities and for which the total number of occurrences in the correspondence is higher or equal to a threshold value defined as either a constant value or a such statistically derived value that corresponds to a certain first percentile (e.g. first decile) of all such named entities arranged on the basis of their number of occurrences in the correspondence. Each named entity visualised in the word cloud 1616 as a text label proportional in its size to its total number of occurrences in the correspondence and is either capped at a constant value or calculated as the total volume of correspondence divided by a constant value that can be either pre-set or derived from the maximum number of occurrences in the correspondence among the named entities to be visualised. The position of each such named entity in the word cloud 1616 can be random as long as the such visualisation does not result in any visualisations of such named entities interfering with each other.

The following are further example embodiments according to the present disclosure.

Some embodiments may include a computer implemented method for monitoring associations between a base correspondent and one or more target correspondents. The method may include retrieving from memory one or more measures of association corresponding to each target correspondent. The method may include displaying on a display: a base icon representative of the base correspondent; target icons corresponding to each of the one or more target correspondents. The target icons may be displayed with one or more attributes, each attribute being functionally dependent on one of the measures of association of the corresponding target correspondent. The method may include displaying on the display a filter option for each of the measures of association. The method may include, in response to user input at one of the filter options, adjusting a threshold of the measure of association corresponding to the filter option, and adapting the display to display target icons that have a measure of association within the threshold.

In some embodiments of the method, the attribute is a distance of the target icon from the base icon. In some embodiments of the method, the attribute is a size of the target icon. In some embodiments of the method, the attribute is a colour of the target icon. In some embodiments of the method, any of the measures of association may be any of: a measure of closeness of relationship between the base correspondent and a target correspondent; a measure of importance of relationship between the base correspondent and a target correspondent; and a measure of the quantity of communications between the base correspondent and a target correspondent.

In some embodiments of the method, one or more filter options are sliders. In some embodiments of the method, one or more filter options are dropdown boxes. In some embodiments of the method, adapting the display comprises animating the target icons to appear or disappear from the display. In some embodiments of the method, the base and target icons each comprise a circle with text indicative of the corresponding correspondent.

Some embodiments may include a computer system for monitoring associations between a base correspondent and one or more target correspondents. The computer system may include one or more processors; and memory comprising instructions. When the instructions are executed by the one or more processors, the instructions may cause the computer system to: retrieve from memory one or more measures of association corresponding to each target correspondent and display on a display: a base icon representative of the base correspondent; target icons corresponding to each of the one or more target correspondents, wherein the target icons are displayed with one or more attributes, each attribute being functionally dependent on one of the measures of association of the corresponding target correspondent; and a filter option for each of the degrees of association. The instructions may cause the computer system to, in response to user input at one of the filter options, adjust a threshold of the measure of association corresponding to the filter option, and adapt the display to display target icons that have a degree of association within the threshold.

Some embodiments may include a non-transitory computer readable medium for monitoring associations between a base correspondent and one or more target correspondents. The non-transitory computer readable medium may include computer executable instructions stored thereon for implementing a method. The method may include retrieving from memory one or more measures of association corresponding to each target correspondent. The method may include displaying on a display: a base icon representative of the base correspondent; target icons corresponding to each of the one or more target correspondents, wherein the target icons are displayed with one or more attributes, each attribute being functionally dependent on one of the measures of association of the corresponding target correspondent; and a filter option for each of the degrees of association. The method may include, in response to user input at one of the filter options, adjusting a threshold of the measure of association corresponding to the filter option, and adapting the display to display target icons that have a measure of association within the threshold.

It is to be understood that the present disclosure includes permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

The invention claimed is:

1. A computer implemented method for automatically finding a quantifiable measure of characteristics in a plurality of communications between a first correspondent and a second correspondent, the method comprising:
- receiving metadata for each of the plurality of communications;
- receiving digital content for each of the plurality of communications;
- determining one or more measures of association between the first and second correspondent based upon the plurality of communications between the first and second correspondents to automatically find the quantifiable measure of characteristics, wherein the one or more measures of association includes at least one of a measure of importance and a measure of closeness of a relationship between the first correspondent and the second correspondent, and said determining comprises identifying one or more indicators of association in said metadata and searching the digital content of the plurality of communications between the first and second correspondents for indicators of association wherein the indicators of association include emotive content;
- storing in memory the one or more measures of association between the first and second correspondents, the one or more measures of association based upon the plurality of communications between the first and second correspondents;
- determining a closeness score based on the one or more indicators of association in said metadata and the indicators of association in the digital content, wherein the closeness score indicates a closeness of association between the first correspondent and the second correspondent; and
- displaying at least one of the one or more measures of association between the first correspondent and the second correspondent and the closeness score indicating a closeness of association between the first correspondent and the second correspondent on a display.

2. The method of claim 1, wherein the plurality of communications are received over a predetermined period of time.

3. The method of claim 1, wherein the plurality of communications include any one or more of: a phone call, an email, and an electronic message.

4. The method of claim 1, wherein the indicators of association include a frequency of communications between the first and second correspondent.

5. The method of claim 1, wherein the indicators of association include one or more of: a ratio of inbound and outbound communications within the plurality of communications, a quantity of related communications within the plurality of communications, a size of a communication, a time of a communication, a ratio of inbound and outbound correspondence within a communication, a latency between related communications within the plurality of communications, a difference in timing of one of the plurality of communications relative to another of the plurality of communications, a quantity of correspondents associated with a communication, and a format of communication.

6. The method of claim 1, wherein the emotive content includes one or more of: a sound of laughter, and an emoticon.

7. The method of claim 1, wherein, in the digital content, the indicators of association include at least one of: an external link, a meeting arrangement, an urgency indicator, or an indication to change communication means.

8. The method of claim 1, wherein, in the digital content the indicators of association include detectably informal content, said detectably informal content comprising one or more of: spelling errors, and humour flags.

9. The method of claim 1, wherein, in the digital content the indicators of association include content in more than one language.

10. The method of claim 1, wherein said determining comprises calculating a score based on weighted sums of said indicators of association.

11. The method of claim 10 wherein said score is further based on a weighted sum of quantity of content indicative of association.

12. The method of claim 10, wherein weighting is determined by machine learning.

13. The method of claim 1, further comprising determining one or more measures of association between the first correspondent and each of a plurality of correspondents.

14. The method of claim 13, further comprising:
- retrieving from memory the one or more measures of association corresponding to each of the plurality of correspondents;
- displaying on the display:
  - a base icon representative of the first correspondent; and
  - target icons corresponding to each of the plurality of correspondents, wherein the target icons are displayed with one or more attributes, each attribute being functionally dependent on one of the degrees of association of the corresponding correspondent.

15. The method of claim 14, wherein the attribute is at least one of a distance of the target icon from the base icon, a size of the target icon, or a colour of the target icon.

16. A computer system for automatically finding a quantifiable measure of characteristics in a plurality of communications between a first correspondent and a second correspondent, comprising:
- one or more processors; and
- memory comprising instructions which when executed by the one or more processors cause the computer system to:
- receive metadata for each of the plurality of communications;
- receive digital content for each of the plurality of communications;
- determine one or more measures of association between the first and second correspondent based upon the plurality of communications between the first and second correspondents to automatically find the quantifiable measure of characteristics, wherein the one or more measures of association includes at least one of a measure of importance and a measure of closeness of a relationship between the first correspondent and the second correspondent, and said determining comprises identifying one or more indicators of association in said metadata and search the digital content of the plurality of communications between the first and second correspondents for content indicative of association, and wherein the content indicative of association includes emotive content;
- store in memory the one or more measures of association between the first and second correspondents, the one or more measures of association based upon the plurality of communications between the first and second correspondents;
- determine a closeness score based on the one or more indicators of association in said metadata and the indicators of association in the digital content, wherein the closeness score indicates a closeness of association between the first correspondent and the second correspondent; and displaying at least one of the one or more measures of association between the first correspondent and the second correspondent and the closeness score indicating a closeness of association between the first correspondent and the second correspondent on a display.

17. A non-transitory computer readable medium for automatically finding a quantifiable measure of characteristics in a plurality of communications between a first correspondent and a second correspondent, the non-transitory computer readable medium having computer executable instructions stored thereon for implementing a method, the method comprising:

receiving metadata for each of the plurality of communications;

receiving digital content for each of the plurality of communications;

determining one or more measures of association between the first and second correspondent based upon the plurality of communications between the first and second correspondents to automatically find the quantifiable measure of characteristics, wherein the one or more measures of association include at least one of a measure of importance and a measure of closeness of a relationship between the first correspondent and the second correspondent, and said determining comprises identifying one or more indicators of association in said metadata and searching the digital content of the plurality of communications between the first and second correspondents for content indicative of association, and wherein the content indicative of association includes emotive content;

storing in memory the one or more measures of association between the first and second correspondents, the one or more measures of association based upon the plurality of communications between the first and second correspondents;

determining a closeness score based on the one or more indicators of association in said metadata and the indicators of association in the digital content, wherein the closeness score indicates a closeness of association between the first correspondent and the second correspondent; and displaying at least one of the one or more measures of association between the first correspondent and the second correspondent and the closeness score indicating a closeness of association between the first correspondent and the second correspondent on a display.

* * * * *